(12) United States Patent
Donderici et al.

(10) Patent No.: US 11,054,541 B2
(45) Date of Patent: Jul. 6, 2021

(54) LOOK-AHEAD OF THE BIT RESITIVITY TOOL

(71) Applicant: Halliburton Energy Services, Inc., Houston, TX (US)

(72) Inventors: Burkay Donderici, Pittsford, NY (US); Michael S. Bittar, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 500 days.

(21) Appl. No.: 15/953,617

(22) Filed: Apr. 16, 2018

(65) Prior Publication Data

US 2018/0246247 A1    Aug. 30, 2018

Related U.S. Application Data

(62) Division of application No. 14/110,683, filed as application No. PCT/US2011/060866 on Nov. 15, 2011, now Pat. No. 9,971,057.

(51) Int. Cl.
| | |
|---|---|
| *G01V 1/38* | (2006.01) |
| *G01V 3/38* | (2006.01) |
| *E21B 7/04* | (2006.01) |
| *G01V 3/28* | (2006.01) |
| *G01V 3/26* | (2006.01) |

(52) U.S. Cl.
CPC ............ *G01V 3/38* (2013.01); *E21B 7/04* (2013.01); *G01V 3/26* (2013.01); *G01V 3/28* (2013.01)

(58) Field of Classification Search
CPC ........................................................ G02V 3/38
USPC ............................................................ 702/7
See application file for complete search history.

(56) References Cited

U.S. PATENT DOCUMENTS

| | | |
|---|---|---|
| 5,279,365 A | 1/1994 | Yenulis et al. |
| 5,594,343 A | 1/1997 | Clark et al. |
| 5,881,310 A | 3/1999 | Airhart et al. |
| (Continued) | | |

FOREIGN PATENT DOCUMENTS

| | | |
|---|---|---|
| AU | 2011381036 B2 | 8/2015 |
| AU | 2012339893 B2 | 3/2016 |
| (Continued) | | |

OTHER PUBLICATIONS

Malaysian Application Serial No. PI2014001257; Substantive Clear Report; dated Jul. 31, 2018, 2 pages.

(Continued)

*Primary Examiner* — Ricky Go
(74) *Attorney, Agent, or Firm* — Gilliam IP LLC

(57) ABSTRACT

An apparatus for measuring resistivity downhole in a well includes a tool having at least one transmitter antenna and receiver antenna. The transmitter antenna and the receiver antenna are tilted at angles such that signals from layers between the transmitter antenna and the receiver antenna are at least reduced. Alternatively, the transmitter antenna and the receiver antenna are tilted at angles such that signals from layers being outside a region between the transmitter antenna and the receiver antenna are at least reduced. Signals from multiple collocated antennas are combined to produce synthetical tilt angles. Tilted transmitter and receiver pairs are used to focus resistivity measurements ahead of the bit or around the tool, based on which region of signals are at least reduced.

20 Claims, 26 Drawing Sheets

(56) References Cited

U.S. PATENT DOCUMENTS

| | | | |
|---|---|---|---|
| 6,181,138 B1 | 1/2001 | Hagiwara et al. | |
| 7,093,672 B2 | 8/2006 | Seydoux et al. | |
| 7,525,315 B2 | 4/2009 | Fredette et al. | |
| 7,599,825 B2 | 10/2009 | Yang et al. | |
| 7,686,099 B2 | 3/2010 | Rodney | |
| 7,755,361 B2 | 7/2010 | Seydoux et al. | |
| 8,902,703 B2 | 12/2014 | Rodney et al. | |
| 2003/0071626 A1* | 4/2003 | Omeragic | G01V 3/28 324/338 |
| 2005/0034917 A1* | 2/2005 | Mathiszik | G01V 1/44 181/108 |
| 2005/0088181 A1* | 4/2005 | Barber | G01V 3/28 324/346 |
| 2006/0033502 A1 | 2/2006 | Bittar | |
| 2007/0052551 A1 | 3/2007 | Lovell et al. | |
| 2008/0136419 A1 | 6/2008 | Seydoux et al. | |
| 2008/0278169 A1* | 11/2008 | Bittar | G01V 3/28 324/333 |
| 2010/0097065 A1* | 4/2010 | Itskovich | G01V 3/28 324/336 |
| 2010/0156424 A1 | 6/2010 | Bittar et al. | |
| 2010/0176812 A1* | 7/2010 | Bittar | G01V 3/24 324/339 |
| 2010/0213943 A1 | 8/2010 | Georgi et al. | |
| 2011/0133740 A1 | 6/2011 | Seydoux et al. | |
| 2011/0238312 A1* | 9/2011 | Seydoux | G01V 3/30 702/6 |
| 2011/0298461 A1 | 12/2011 | Bittar et al. | |
| 2012/0024600 A1 | 2/2012 | Bittar et al. | |
| 2012/0166086 A1* | 6/2012 | Zhong | G01V 3/28 702/7 |
| 2012/0186873 A1* | 7/2012 | Shayegi | E21B 21/08 175/25 |
| 2012/0298420 A1* | 11/2012 | Seydoux | E21B 47/02 175/26 |
| 2014/0249754 A1 | 9/2014 | Donderici et al. | |
| 2014/0350858 A1 | 11/2014 | Donderici | |

FOREIGN PATENT DOCUMENTS

| | | |
|---|---|---|
| CN | 1891979 A | 1/2007 |
| CN | 101124489 A | 2/2008 |
| CN | 101918863 A | 12/2010 |
| CN | 101932955 A | 12/2010 |
| CN | 102140889 A | 8/2011 |
| CN | 103477247 A | 12/2013 |
| CN | 105672999 A | 6/2016 |
| EP | 0314573 B1 | 1/1993 |
| WO | 2009029517 A3 | 3/2009 |
| WO | 2010074678 A2 | 7/2010 |
| WO | 2011043851 A1 | 4/2011 |
| WO | 2011049828 A2 | 4/2011 |
| WO | 2011090481 A1 | 7/2011 |
| WO | 2012102705 A1 | 8/2012 |
| WO | 2013074091 A1 | 5/2013 |
| WO | 2013074411 A2 | 5/2013 |
| WO | 2013074411 A3 | 5/2013 |

OTHER PUBLICATIONS

Indian Application Serial No. 3833/DELNP/2014; Examination Report; dated Dec. 6, 2018, 6 pages.
Chinese Application Serial No. 201610027111.0; Office Action; dated Feb. 19, 2019, 7 pages.
Malaysian Application Serial No. PI2014001402; Substantive Exam Adverse Report; dated Jan. 22, 2019, 3 pages.
Chinese Application Serial No. 201280067107.7; Chinese Office Action; dated Apr. 8, 2018, 8 pages.
Australian Application Serial No. 2011381036, First Examiner's Report dated May 20, 2015, 3 pgs.
Australian Application Serial No. 2012339893, First Examiner's Report dated May 16, 2015, 3 pgs.
Brazilian Application Serial No. 1120140117284, Amendment filed Jun. 6, 2014, 8 pgs.
Canadian Application Serial No. 2,854,440, Office Action dated Feb. 6, 2017., 3 pages.
Canadian Application Serial No. 2,854,440, Office Action dated Jun. 9, 2015, 4 pgs.
Canadian Application Serial No. 2,855,305, Office Action dated Feb. 22, 2016, 3 pgs.
Canadian Application Serial No. 2,855,305, Office Action dated Jun. 10, 2015, 5 pgs.
Chinese Application Serial No. 201180074874.6, Office Action dated May 5, 2016, (w/ English Translation), 12 pgs.
Chinese Application Serial No. 201180074874.6, Office Action dated Jun. 30, 2015, (w/ English Translation), 14 pgs.
Chinese Application Serial No. 201280067107.7, Office Action dated Sep. 28, 2016, 14 pages.
CN Application Serial No. 201280067107.7, Second Office Action, dated Jul. 10, 2017.
European Application Serial No. 11788300.9, Office Action dated Apr. 7, 2015, 5 pgs.
European Application Serial No. 11788300.9, Office Action dated Jul. 12, 2016, 6 pgs.
European Application Serial No. 11788300.9, Office Action dated Jul. 15, 2014, 2 pgs.
European Application Serial No. 12849836.7, Examination Report dated Mar. 30, 2017.., 4 pages.
European Application Serial No. 12849836.7, Extended European Search Report dated Jul. 19, 2016, 8 pgs.
Gulf Cooperation Council Application Serial No. 2012-21769, First Examiner Report dated Oct. 26, 2016., 3 pages.
Gulf Cooperation Council Application Serial No. 2012-22769, Second Examiner Report dated Jul. 25, 2017, 4 pages.
Gulf Cooperation Council Application Serial No. 2013-25764, First Examination Report dated May 31, 2017, 4 pages.
International Application Serial No. PCT/US2011/060866, International Preliminary Report on Patentability dated May 30, 2014, 8 pgs.
International Application Serial No. PCT/US2011/060866, International Search Report dated Jul. 4, 2012, 4 pgs.
International Application Serial No. PCT/US2011/060866, Written Opinion dated Jul. 4, 2012, 6 pgs.
International Application Serial No. PCT/US2012/064405, International Preliminary Report on Patentability dated Nov. 22, 2013, 8 pgs.
International Application Serial No. PCT/US2012/064405, International Search Report dated Jan. 25, 2013, 2 pgs.
International Application Serial No. PCT/US2012/064405, Written Opinion dated Jan. 25, 2013, 5 pgs.
Malaysian Application Serial No. PI 2014001257, Preliminary Examination Report dated Oct. 16, 2014, 2 pgs.
Malaysian Application Serial No. PI2014001257; Examination Report dated Sep. 29, 2017, 3 pages.
Mexican Application Serial No. MX/a/2014/005846, Office Action dated Oct. 17, 2016, 3 pgs.
Russian Application Serial No. 2014123688, Office Action dated Jul. 30, 2015, (w/ English Translation), 6 pgs.
Bittar, et al., "A New Azimuthal Deep-Reading Resistivity Tool for Geosteering and Advanced Formation Evaluation", SPE Reservoir Evaluation and Engineering, vol. 12, No. 2, 270-279, Apr. 2009.
Borghi, et al., "New Logging-While-Drilling Azimuthal Resistivity an d High Resolution Imaging in Slim Holes", The 10th Offshore Mediterranean Conference and Exhibition, Mar. 2011, pp. 1-9.
Chemali, et al., "Real Time Deep Electrical Images, a Highly Visual Guide for Proactive Geosteering", AAPG GEO 2010 Middle East Geoscience Conference & Exhibition Innovative Geoscience Solutions—Meeting Hydrocarbon Demand in Changing Times, Mar. 7-10, 2010—Manama, Bahrain, [online]. [retrieved on Mar. 26, 2015]., Jan. 1, 2010 00:00:00.0, 7 pgs.
Iversen, et al., "Geosteering using Ultradeep Resistivity on the Grane Field, Norwegian North Sea", Petrophysics, 45(3), 232-240, Jun. 2004.

(56) References Cited

OTHER PUBLICATIONS

Netto, et al., "Landing a well using a deep electromagnetic directional LWD tool. Can we spare a pilot well?", SPWLA 53rd Annual Logging Symposium, Jun. 16-20, 2012, Jan. 1, 2012 00:00:00.0, 1-12.

Ortenzi, et al., "New Azimuthal Resistivity and High-Resolution Imager Facilitates Formation Evaluation and Well Placement of Horizontal Slim Boreholes", SPWLA 52nd Annual Logging Symposium, May 1, 2011 00:00:00.0, 1-12.

Seifert, et al., "SPE/IADC 140327 Hydrocarbon Reservoirs Where Proactive Geosteering is Most Likely to Succeed", SPE/IADC Drilling Conference and Exhibition, Mar. 1-3, Amsterdam, The Netherlands, Mar. 1, 2011 00:00:00.0, 1-10.

Tang, et al., "An efficient multi-boundaries determination method for geosteering complex reservoirs", SEG Las Vegas 2012 Annual Meeting, Technical Program Expanded Abstracts, Jan. 1, 2012 00:00:00.0, 1-5.

Zimmer, et al., "Drilling a Better Pair: New Technologies in SAGD Directional Drilling", Canadian Unconventional Resources and International Petroleum Conference, Oct. 19-21, 2010, Calgary, Alberta, Canada, 1-22.

CN Application Serial No. 201280067107.7, Notice of Reexamination, dated Sep. 19, 2019, 14 pages.

BR Application Serial No. 1120140117284, First Office Action, dated Aug. 30, 2019, 5 pages.

Chinese Application Serial No. 201610027111.0; First Examination Report; dated May 16, 2018, 15 pages.

GCC Application Serial No. 2012/22769; Third Examination Report; dated Mar. 15, 2018, 4 pages.

U.S. Appl. No. 14/357,740, Non-Final Office Action, dated Jan. 6, 2020, 26 pages.

CN Application Serial No. 201280067107.7, Notice of Reexamination, dated Jun. 18, 2019, 10 pages.

IN Application Serial No. 4011/DELNP/2014; Notice of Hearing; mailed May 8, 2019, 2 pages.

CA Application Serial No. 2,987,206; Office Action; dated Jul. 18, 2019, 4 pages.

EP Application Serial No. 11788300.9; Communication Pursuant to Article 94(3); dated Aug. 9, 2019, 4 pages.

* cited by examiner

210 — CONTROL ACTIVATION OF A TOOL DISPOSED DOWNHOLE, THE TOOL HAVING AN ARRANGEMENT OF SPACED APART TRANSMITTER ANTENNAS AND RECEIVER ANTENNAS OPERABLE IN SELECTED TRANSMITTER-RECEIVER PAIRS

220 — ACQUIRE A DEEP SIGNAL FROM A DEEP MEASUREMENT USING A TRANSMITTER-RECEIVER PAIR AND ACQUIRE ONE OR MORE SHALLOW SIGNALS FROM ONE OR MORE SHALLOW MEASUREMENTS USING ONE OR MORE OTHER TRANSMITTER-RECEIVER PAIRS

230 — PROCESS THE ONE OR MORE SHALLOW SIGNALS, GENERATING A MODELED SIGNAL RELATIVE TO REGIONS ADJACENT SIDES AND BACK OF THE TOOL

240 — FORM A LOOK-AHEAD SIGNAL SUBSTANTIALLY WITHOUT CONTRIBUTIONS FROM THE REGIONS ADJACENT THE TOOL BY PROCESSING THE DEEP SIGNAL WITH RESPECT TO THE MODELED SIGNAL

Fig. 2

LOOK-AHEAD OF THE BIT RESITIVITY TOOL

TECHNICAL FIELD

The present invention relates generally to systems having well logging capability.

BACKGROUND

In drilling wells for oil and gas exploration, understanding the structure and properties of the geological formation surrounding a borehole provides information to aid such exploration. However, the environment in which the drilling tools operate is at significant distances below the surface and measurements to manage operation of such equipment are made at these locations. Logging is the process of making measurements via sensors located downhole, which can provide valuable information regarding the formation characteristics. Measurement techniques can utilize electromagnetic signals that can make deep measurements, which are less affected by the borehole and the effects of the zone invaded by the drilling, and shallow measurements, which are near the tool providing the probe signals. Most conventional tools are located above the drill motor on the drill string and make measurements from formations that have already been penetrated by the drill bit. Further, the usefulness of such measurements may be related to the precision or quality of the information derived from such measurements.

BRIEF DESCRIPTION OF THE DRAWINGS

FIG. 2 shows features of an example method for a look-ahead of the bit applications in a drilling operation, in accordance with various embodiments.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
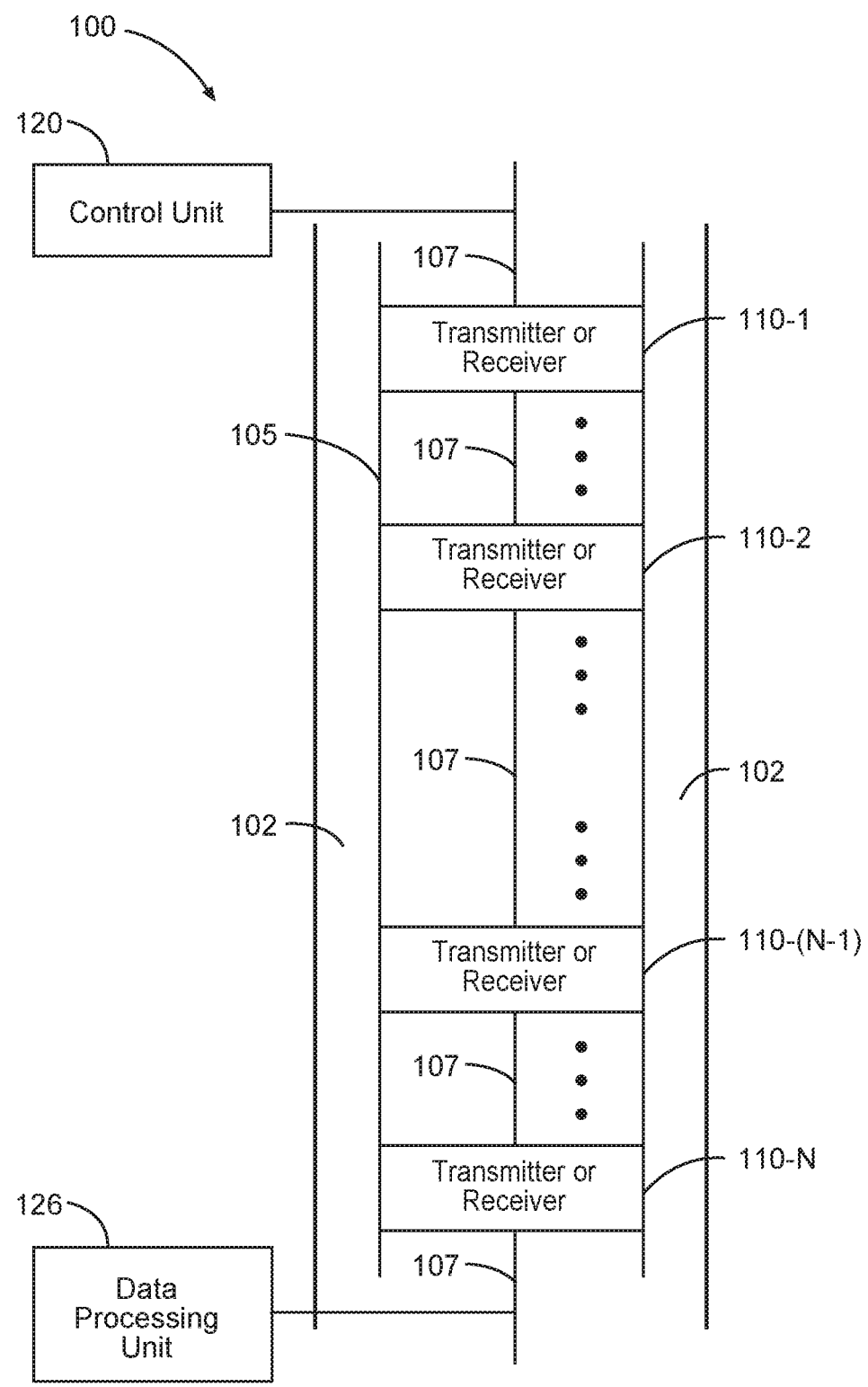
FIG. 1 shows a block diagram of an example apparatus having a tool to make measurements ahead of a drill bit, according to various embodiments.

FIG. 1 shows a block diagram of an embodiment of an apparatus 100 having a tool 105 to make measurements ahead of a drill bit that can be used to determine a look-ahead signal and to determine properties downhole in a well 102. Tool 105 can have an arrangement of transmitters and receivers 110-1, 110-2 . . . 110-(N−1), 110-N structured relative to a longitudinal axis 107 of tool 105. These transmitters and receivers can be operated to capture signals near tool 105 in regions behind tool 105 and regions adjacent to the sides of tool 105. These relatively short-range signals can be referred to as shallow signals. These transmitters and receivers also can be operated to capture signals in regions in front of tool 105 and with tool 105 arranged on a drilling structure, the signals captured from in front of tool 105 can include regions ahead of a drill bit. These relatively long-range signals, deeper than shallow signals, can be referred to as deep signals. The arrangement of transmitters and receivers 110-1, 110-2 . . . 110-(N−1), 110-N can be operated by selecting transmitters-receivers pairs defined by the spacing between the transmitter and the receiver in each respective pair. Large spacings can be used to probe ahead of the drill bit and acquire deep signals. Smaller spacings can be used to probe in the formation regions around tool 105. A deep signal and a shallow signal may be correlated to the transmitter-receiver spacing, which may in turn be set by the location of the transmitters and receivers behind the drill bit. For example, a shallow measurement may include contributions from regions about one inch to about 10 ft from the tool and a deep measurement may include contributions from regions about 5 ft to about 200 ft from the tool. In making shallow and deep measurements, the deep measurements include contributions from regions farther from the tool than shallow measurements. For example, the deep measurements can provide contributions from distances from the tool that are, but not limit to, at least 25% larger than the distances that provide contributions in the shallow measurements. The difference in contribution distances can be less than or more than 25% larger.

An arrangement of transmitter antennas and receiver antennas can be structured along longitudinal axis 107 of tool 105, which is essentially perpendicular to the cross section of the tool corresponding to the cross section of a collar in a drill string. The arrangement can include the transmitters and receivers spaced apart from each other such that one of the transmitters or receivers is located nearest the drill bit and a last of the transmitters or receivers in the arrangement is the farthest from the drill bit. The one transmitter or receiver nearest the drill bit can be located as close to the drill bit as possible. The closer to the drill bit that the arrangement begins, the formation properties farther away from the drill bit can be determined. The first antenna may be placed on a collar behind the drilling motor. Alternatively, the first antenna may be placed on the drilling motor rather than on a collar behind the drilling motor.

Transmitter-receiver pairs can be arranged, such as by orientation, on tool 105 relative to longitudinal axis 107 of tool 105 by using a special combination of transmitter tilt angle and receiver tilt angle such that signals from the layers between the respective transmitter and receiver of the pair can be cancelled out. The transmitter tilt angle may be the same as the receiver tilt angle or different from the receiver tilt angle. For instance, the receiver may have a zero tilt angle and the transmitter may have a non-zero tilt angle. This arrangement of the transmitter and receiver on tool 105 can make tool 105 insensitive to properties of the region to the side of the tool. Processing of signals acquired by the receiver of the pair in response to a probe signal transmitted by the transmitter of the pair can be implemented to eliminate around-the-tool effects and focus ahead of the bit. Structuring transmitters and their corresponding receivers at a particular layer signal cancelling orientation can be realized for a given dip angle. For transmitters and their corresponding receivers structured at a particular layer signal cancelling orientation for a dip angle of zero degrees, for example, operation at a different dip angle may result in less than complete layer signal cancellation. However, there can be range of dip angles different from the dip angle for which the transmitter and receiver are structured for essentially complete cancellation of the signals from layers at which the signal from the layers is substantially cancelled. Substantial cancellation can include 90% cancellation relative to the optimum cancellation. Transmitters and receivers 110-1, 110-2 . . . 110-(N−1), 110-N of tool 105 can be of sufficient number to allow for transmitter-receivers pairs of different orientation such that an optimum cancellation of a layer signal can be attained by tool 105 for a number of different dip angles.

Look-ahead measurements to provide a look-ahead signal or determine formation properties ahead of the drill bit can be made by tool 105 without using transmitter-receiver pairs oriented such that operation of the transmitter-receiver pairs do not provide layer signal cancellation. Data from one or more shallow measurements can be subtracted from a deep measurement to provide a look-ahead measurement. The data from the look-ahead can be processed to provide a look-ahead signal and to determine formation properties ahead of the drill bit.

Tool 105 can have a plurality of antennas arranged in pairs. A first transmitter-receiver antenna pair can have a spacing between the transmitter and the receiver of the first transmitter-receiver antenna pair in a range from two feet to twenty feet to make a shallow measurement such that layer signals are substantially cancelled out between the transmitter and the receiver of the first transmitter-receiver antenna pair. A second transmitter-receiver antenna pair can have a spacing between the transmitter and the receiver of the second transmitter-receiver antenna pair in a range from twenty feet to a hundred feet to make a deep measurement such that layer signals are substantially cancelled out between the transmitter and the receiver of the second transmitter-receiver antenna pair. The transmitter antenna of the first transmitter-receiver antenna pair is arranged as the transmitter antenna of the second transmitter-receiver antenna pair or the receiver antenna of the first transmitter-receiver antenna pair is arranged as the receiver antenna of the second transmitter-receiver antenna pair.

Apparatus 100 can include a control unit 120 to control activation of the transmitters of tool 105 and reception of signals at the receivers of tools 105. Control unit 105 can be structured to be operable to select antennas of a plurality of antennas in one or more transmitter-receiver pairs arranged to perform one or more deep measurements and one or more shallow measurements when the apparatus is operated downhole in a well. Control unit 120 can be arranged to be operable to select antennas of the plurality in one or more transmitter-receiver pairs arranged to substantially cancel out layer signals between the transmitter antenna and the receiver antenna of the respective transmitter-receiver pair when the tool is operated downhole in a well. Control unit 120 can be arranged to conduct, among other operations using a transmitter antenna and a corresponding receiver antenna, an absolute deep measurement, a ratio deep measurement with an additional receiver, or a compensated deep measurement with an additional receiver and an additional transmitter such that layer signals are substantially cancelled between transmitter and receiver antenna pairs in the respective measurements. Control unit 120 can operate tool 105 having four antennas arranged to make shallow measurements and deep measurements and to substantially cancel out layer signals from operation of the four antennas. Control unit 120 can operate tool 105 having less than four antennas arranged to make shallow measurements and deep measurements and to substantially cancel out layer signals from operation of the four antennas. Control unit 120 can be operated in conjunction with data processing unit 126 to process signals received from the receivers in tool 105.

Data processing unit 126 can be structured to be operable to process data from one or more deep measurements and one or more shallow measurements to generate a look-ahead signal substantially without or substantially without contributions from regions adjacent sides of the tool. Data processing unit 126 can include instrumentalities to perform one or more techniques to process signals from shallow measurements and signals from deep measurements to generate a look-ahead signal. A look-ahead signal is defined as signal correlated to the region ahead of the drill bit associated with a drilling operation. Data processing unit 126 also can use the generated look-ahead signal to determine formation properties ahead of the drill bit. The look-ahead signal and/or the determined formation properties ahead of the drill bit can be used to make geosteering decisions. Geosteering is an intentional control to adjust drilling direction.

The techniques to determine the look-ahead signal and/or the formation properties ahead of the drill bit can include various applications of inversion operations, forward modeling, using synthetic logs, and filtering techniques. Inversion operations can include a comparison of measurements to predictions of a model such that a value or spatial variation of a physical property can be determined. A conventional inversion operation can include determining a variation of electrical conductivity in a formation from measurements of induced electric and magnetic fields. Other techniques, such as a forward model, deal with calculating expected observed values with respect to an assumed model. A synthetic log is a modeled log based on modeled response of the tool in known formation parameters. The synthetic log is created by numerically modeling the interaction of the tool and the formation, usually involving simulation of each depth of the log point by point.

Data processing unit 126 can be arranged to be operable to equalize data from one or more shallow measurements in terms of geometrical factors to the data from one or more deep measurements such that difference between data from the one or more deep measurements and the equalized data from the one or more shallow measurements provides the look-ahead signal. The equalization can be realized via a deconvolution filter. Data processing unit 126 can be arranged to be operable to perform an inversion based on signals from the one or more shallow measurements and signals from the one or more deep measurements and operable to subtract an anticipated deep signal, derived from the inversion, from a measured deep measurement signal to generate the look-ahead signal. Data processing unit 126 can be arranged to be operable to perform an inversion based on signals from the one or more shallow measurements without input from the one or more deep measurements and operable to subtract a signal resulting from the inversion being applied to a forward modeling of a deep configuration to generate the look-ahead signal. Data processing unit 126 can use data attained with transmitter-receiver antenna pairs selected such that a layer signal between the transmitter antenna and the receiver antenna of the respective transmitter-receiver pair is substantially cancelled out in response to the transmitter antenna being operated. Data processing unit 126 can use data attained from transmitter-receiver antenna pairs that do not operate with signal cancellation from layers.

Transmitters and receivers 110-1, 110-2 . . . 110-(N−1), 110-N of tool 105 can be arranged with collocated multiple antennas with different tilt angles. Circuitry and processing devices executing instructions in control unit 120 and data processing unit 126 can be operated to synthetically create tilt angles by combining signals from the collocated multiple antennas with different tilt angles. This scheme allows apparatus 100 to algorithmically optimize signal cancellation for different formation dip angles. Circuitry and processing devices executing instructions in control unit 120 and data processing unit 126 can be operated to synthetically create tilt angles by combining signals from the collocated multiple antennas to synthetically create the tilt angle to cancel signals from layers between the collocated multiple antennas. The optimized signal cancellation can be used to provide a look-ahead signal and evaluation formation properties ahead of a drill bit.

Transmitters and receivers 110-1, 110-2 . . . 110-(N−1), 110-N of tool 105 can be arranged with a set of transmitters and receivers having selected tilt angles such that signals from layers outside the region between the respective transmitters and receivers of this set can be cancelled. This provides an opposite cancellation to the layer signal cancellation between transmitter and corresponding receiver previously discussed. This produces a shallow reading that is focused around the tool and it can be used in the place of other shallow measurements mentioned herein. A transmitter antenna and a receiver antenna can be arranged along a longitudinal axis of tool 105 such that at least one of the transmitter antenna or receiver antenna has a tilt angle with respect to the longitudinal axis of the tool where the orientations of transmitter antenna and the receiver antenna, with respect to the longitudinal axis and with respect to each other, provide for signals from layers outside the region between the respective transmitter and receiver to be operatively cancelled. Circuitry and processing devices executing instructions in control unit 120 and data processing unit 126 can be operated to synthetically create tilt angles by combining signals from the collocated multiple antennas to cancel signals from layers outside the region between the collocated multiple antennas. In applications where signals associated with tilt angles of transmitter and receiver are synthetically generated from collocated antennas with different tilt angles, the same transmitter and receiver pair can be used for both focusing ahead and focusing around tool 105.

Control unit 120 and/or data processing unit 126 can be located at the surface of well 102 operably in communication with tool 105 via a communication mechanism. Such a communication mechanism can be realized as a communication vehicle that is standard for well operations. Control unit 120 and/or data processing unit 126 can be distributed along the mechanism by which tool 105 is placed downhole in well 102. Control unit 120 and/or data processing unit 126 can be integrated with tool 105 such that control unit 120 and/or data processing unit 126 are operable downhole in well 102. Control unit 120 and/or data processing unit 126 can be distributed along tool 105. Such embodiments can provide stable and deep evaluation of formations that have not yet been penetrated by the drill bit during a drilling operation, prevention of dangerous situations such as blowouts, and enhanced recovery of hydrocarbons by providing a geosteering mechanism.

Apparatus 100 can be structured for an implementation in the borehole of a well as a measurements-while-drilling (MWD) system such as a logging-while-drilling (LWD) system. Tool 105 can be located at the drill bit of the drilling operation. Alternatively, apparatus 100 may be configured in a wireline configuration.

FIG. 2 shows features of an example embodiment of a method for a look-ahead of the bit application in a drilling operation. At 210, activation of a tool disposed downhole is controlled, where the tool has an arrangement of spaced apart transmitter antennas and receiver antennas operable in selected transmitter-receiver pairs. Controlling activation of the tool can include selecting operation of transmitter-receiver antenna pairs such that layer signals between the transmitter antenna and the receiver antenna of the respective transmitter-receiver pair are substantially cancelled out in response to the transmitter antenna transmitting a probe signal. Transmitter-receiver antenna pairs can be operated in which signals from layers between the transmitter antenna and the receiver antenna of the respective transmitter-receiver pair are not cancelled with respect to a probe signal from the transmitter.

At 220, a deep signal from a deep measurement using a transmitter-receiver pair is acquired and one or more shallow signals from one or more shallow measurements using one or more other transmitter-receiver pairs are acquired. In situations where there is not a cancellation of layer signals from operating the transmitter, multiple shallow measurements can be made.

At 230, the one or more shallow signals are processed, generating a modeled signal relative to regions adjacent sides and back of the tool. At 240, a look-ahead signal substantially without contributions from the regions adjacent the tool is formed by processing the deep signal with respect to the modeled signal.

Processing the one or more shallow signals and forming the look-ahead signal can include equalizing the one or more shallow signals in terms of geometrical factors to the deep signal such that difference between the deep signal and the equalized one or more shallow signals provides the look-ahead signal. Equalizing the one or more shallow measurements can include generating a shallow to deep translation filter via a deconvolution of shallow geometric factors and deep geometric factors. Processing the one or more shallow signals can include performing an inversion based on the one or more shallow signals and the deep signal such that the modeled signal is derived as an anticipated deep signal from the inversion. Subsequently, forming the look-ahead signal can include subtracting the modeled signal from the deep signal to generate the look-ahead signal. Processing the one or more shallow signals can include performing an inversion based on the one or more shallow signals without input from the deep signal and applying a signal resulting from the inversion to a forward modeling of a deep configuration to provide the modeled signal. Subsequently, forming the look-ahead signal can include subtracting the modeled signal from the deep signal to generate the look-ahead signal.

In various embodiments, an inversion can be conducted using the look-ahead signal and parameters of layers around the tool to generate resistivities and positions of deep layers ahead of a drill bit corresponding to the tool. The look-ahead signal can be analyzed downhole during a drilling operation and a geosteering decision can be made downhole based of the analysis. Alternatively, the geosteering decision can be made at the surface from reviewing the analysis or conducting the analysis at the surface. The surface activities can be conducted via a user interface operable with a display that provides the analysis or portions of the analysis to an operator. Resistivities and positions of deep layers can be generated as the drill bit moves ahead. The drilling operation can be stopped based on a determination that resistivity changes as the drill bit moves ahead exceeds a threshold for resistivity change. Exceeding the threshold may be indicative of dangerous pressure changes ahead of the drill bit.

Generally, all commercially available electromagnetic tools are most sensitive to the formation properties that are in the section between the transmitter and the receiver positions. However, in some applications, it may be desirable to have more sensitivity above or below this section. For example, such sensitivity may be desirable for geosteering. For geosteering, measurements can be made in the vicinity of the drill bit while drilling to guide the well trajectory effectively towards productive zones or to stop drilling before dangerous zones are penetrated. Although several attempts have been made to design tools that are sensitive to formation properties ahead of the bit, in almost all cases, these tools remain more sensitive to formation properties to the side of the tool. As a result, measurements are complicated by formation profile variations around the tool.

Figure 3A:
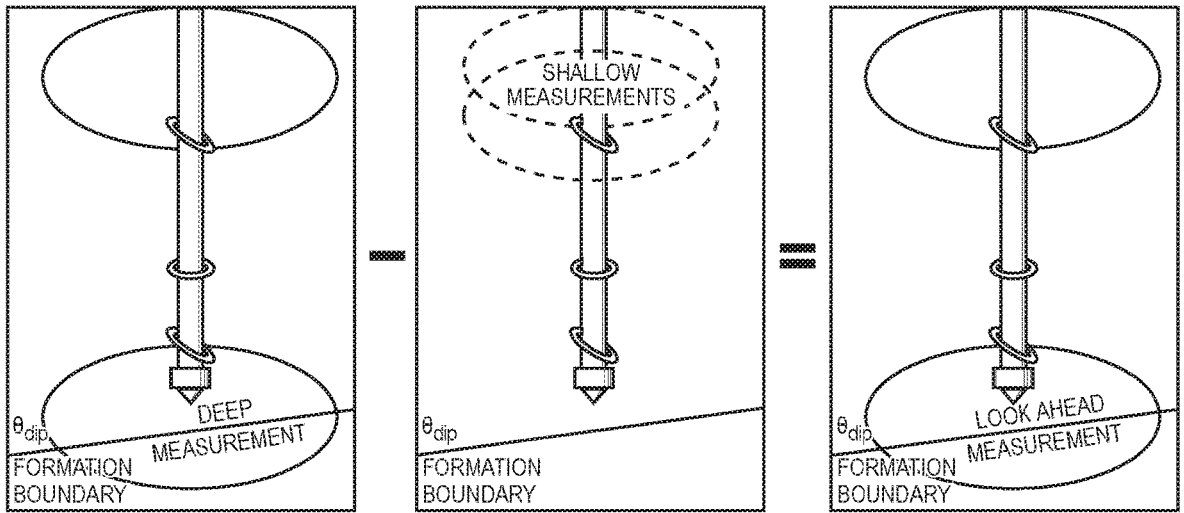
FIGS. 3A and 3B illustrate a look-ahead signal calculation, in accordance with various embodiments.
Figure 3B:
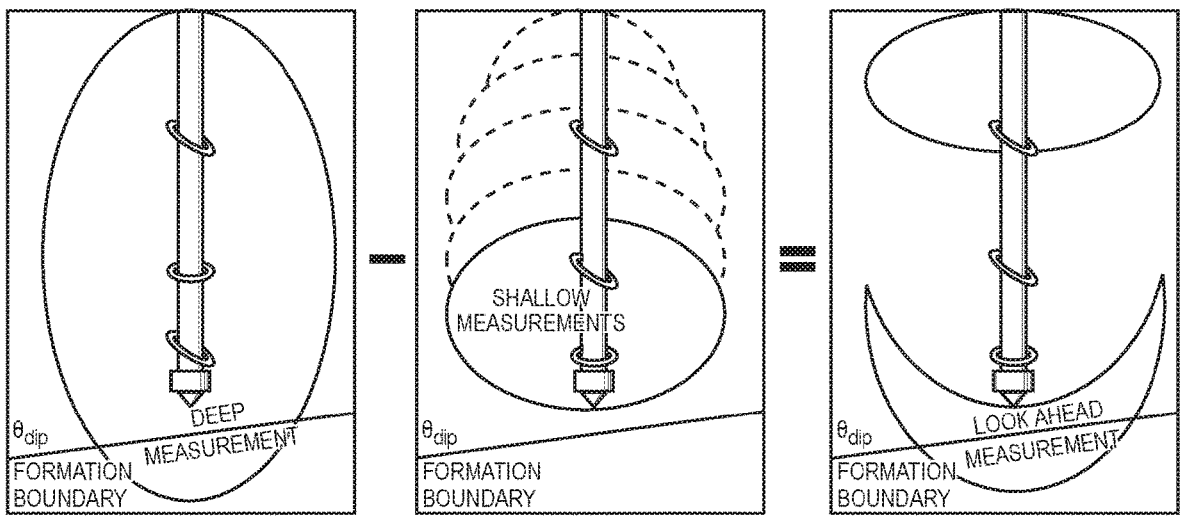

In various embodiments, a process can be implemented to eliminate around-the-tool effects and focus ahead of the bit. This process can be achieved by using a special combination of transmitter tilt angle and receiver tilt angle to cancel out signals from layers that are between transmitter and receiver and make the tool insensitive to properties of the region to the side of the tool. See, for example, FIGS. 4A and 4B. The resulting sensitive areas are shown in the left box of FIG. 3A, where FIG. 3A illustrates a look-ahead measurement from layer signal-cancelling tilt angles. As a second procedure, a separate shallower measurement can be equalized in terms of geometrical factor to the former measurement via a deconvolution filter, and then subtracted from the former measurement. See, for example, the middle and right boxes of FIG. 3A. However, it is noted that the process shown in FIG. 3A can provide significant value to evaluating a drilling operation if shallow measurements are not subtracted. Alternatively, the process can use the subtraction with arbitrary tilt angles without layer signal cancellation as shown in FIG. 3B, which illustrates a look-ahead measurement from arbitrary tilt angles.

Figure 4A:
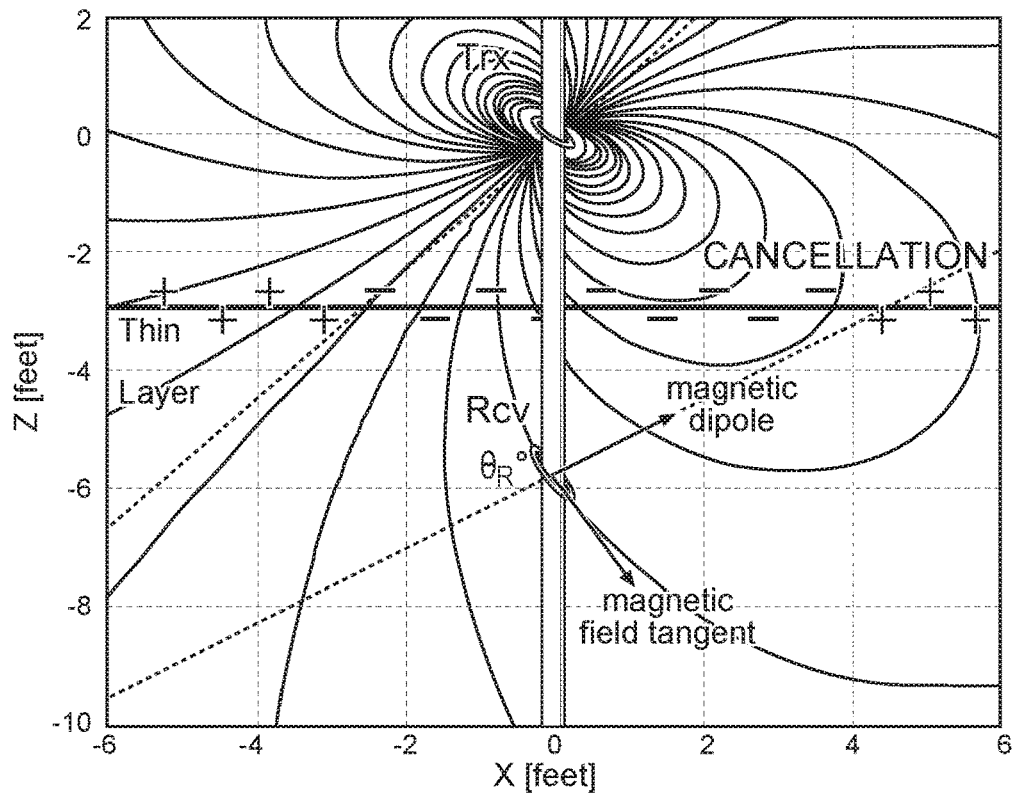
FIGS. 4A and 4B illustrate a layer signal cancellation effect, in accordance with various embodiments.
Figure 4B:
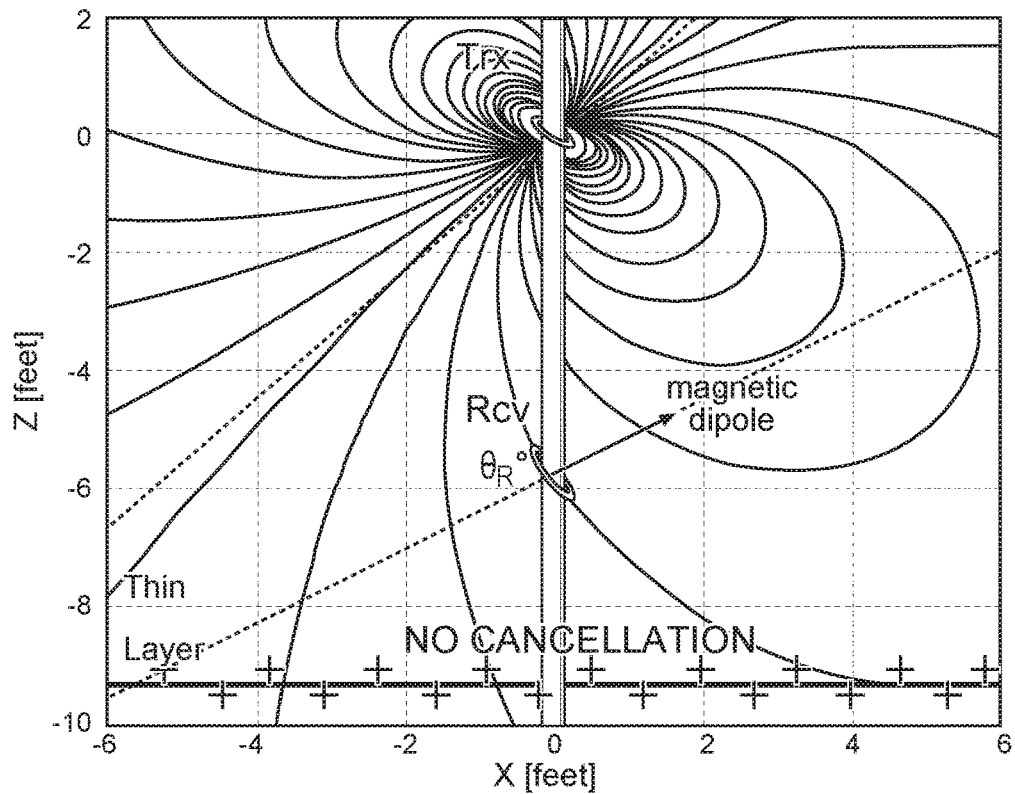

It has been disclosed previously that for a special transmitter and receiver tilt angle combination of a tool, it is possible to cancel out the direct signal from the transmitter to the receiver of the tool. In a different approach in an example embodiment, the signals that are due to formation layers in between the transmitter and receiver are cancelled out. It should be noted that, although this special tilt angle combination does not produce sensitivity reduction when individual points in the three-dimensional space are concerned, it produces sensitivity elimination on planar boundaries with given dip and strike due to layer signal cancellation effects over the surfaces as illustrated in FIGS. 4A and 4B. FIG. 4A illustrates example layer signal cancellation effects with a boundary in between transmitter and receiver. FIG. 4B illustrates example layer signal cancellation effects with a boundary outside transmitter-receiver section. As a result, an embodiment of an example process can be restricted to planar surfaces with known dip and strike angles. It has been observed from studies that even if the surfaces are not perfectly planar, or dip and strike are not precisely known, processes discussed herein can still achieve good cancellation.

Figure 5A:
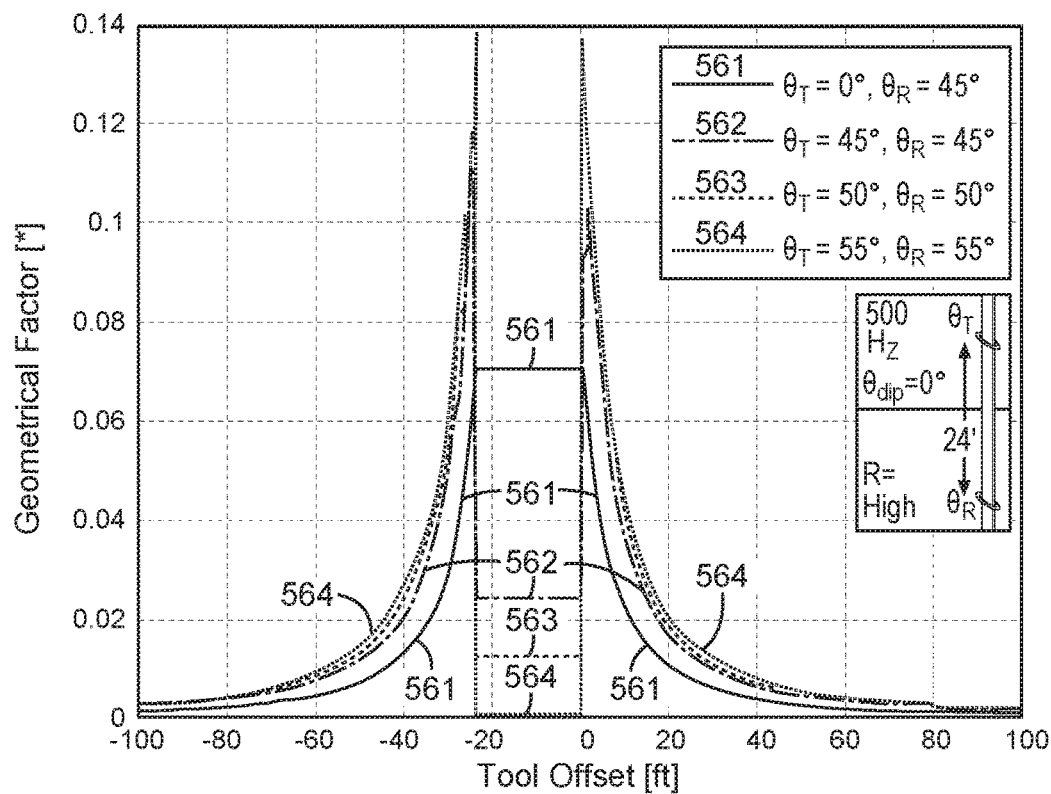
FIGS. 5A and 5B show integrated geometrical factors for a tool, in accordance with various embodiments.
Figure 5B:
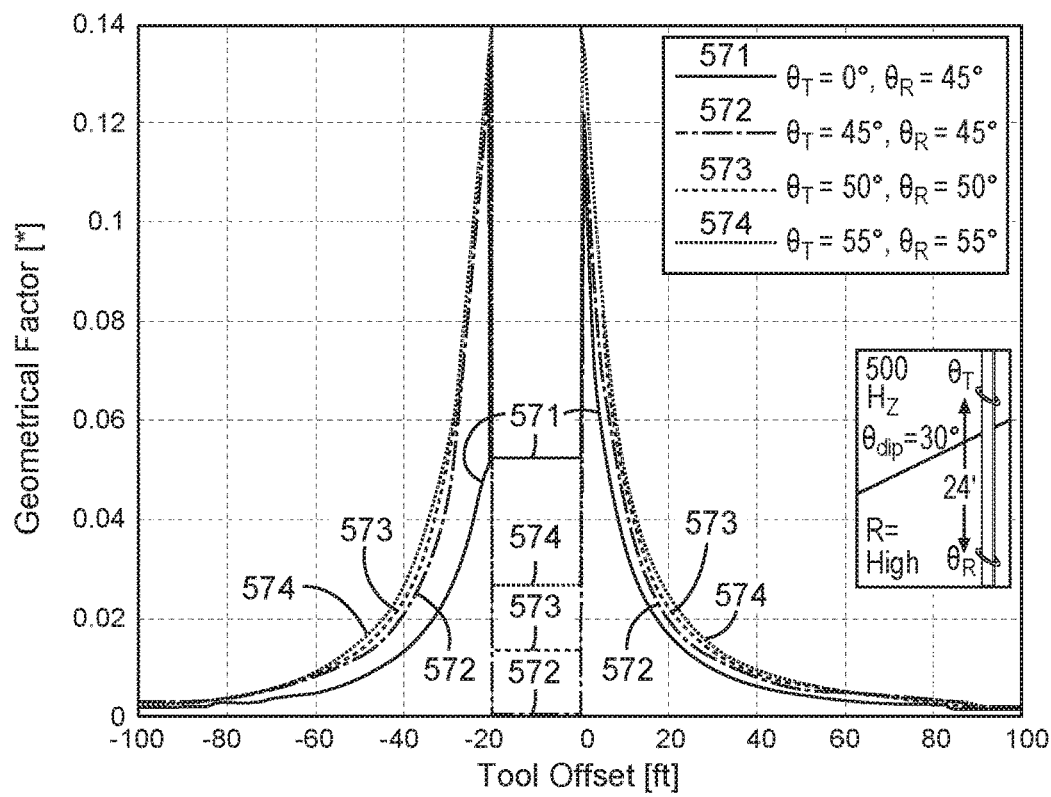

FIGS. 5A and 5B show integrated geometrical factors for a tool. These factors are for a single transmitter, single receiver tool operating at a frequency of f=500 Hz with a spacing of $d_1$=24 feet in a high resistivity region. FIG. 5A shows the integrated (in radial direction) geometrical factors obtained by creating a synthetic log of a very thin low-contrast layer at zero dip angle. Curve 561 is for a transmitter tilt angle of 0° and receiver tilt angle of 45°. Curve 562 is for a transmitter tilt angle of 45° and receiver tilt angle of 45°. Curve 563 is for a transmitter tilt angle of 50° and receiver tilt angle of 50°. Curve 564 is for a transmitter tilt angle of 55° and receiver tilt angle of 55°. It can be seen from FIG. 5A that, at the transmitter and receiver angle of 55°, the geometrical factor diminishes at all positions between the transmitter and the receiver. It should be noted that, although transmitter and receiver tilt is chosen equal in these cases, layer signal cancelling may be achieved with different transmitter and receiver tilt angles. FIG. 5B shows a similar plot but for 30° formation boundary dip angle. Curve 571 is for a transmitter tilt angle of 0° and receiver tilt angle of 45°. Curve 572 is for a transmitter tilt angle of 45° and receiver tilt angle of 45°. Curve 573 is for a transmitter tilt angle of 50° and receiver tilt angle of 50°. Curve 574 is for a transmitter tilt angle of 55° and receiver tilt angle of 55°. In this case, layer signal cancellation can still be achieved, but at a different angle of approximately 45° as shown in curve 572. Even at the non-optimum tilt angle of 55°, a relatively good cancellation is achieved. As a result, a 45 or 55° tilt angle tool is expected to perform well in the dip angle range of 0-30° for the frequency and spacing used. This methodology can be used to design tools that are optimum for different dip angle ranges. It is also important to note that similar optimization process can be used to achieve the opposite cancellation: signal from outside the region between the transmitter and receivers can be cancelled by adjusting the transmitter and receiver tilt angles accordingly. This produces a shallow reading that is focused around the tool and it can be used in the place of any shallow measurement that is mentioned herein. One way to obtain such configuration is to start with the configuration in Curve 561, and decrease the transmitter and receiver tilt angles until sensitivity between the transmitter and the receiver is substantially larger than the signal outside on that region. In the case where signals associated with tilt angles of transmitter and receiver are synthetically generated from collocated antennas with different tilt angles, same transmitter and receiver pair can be used for both focusing ahead and focusing around.

Figure 6:
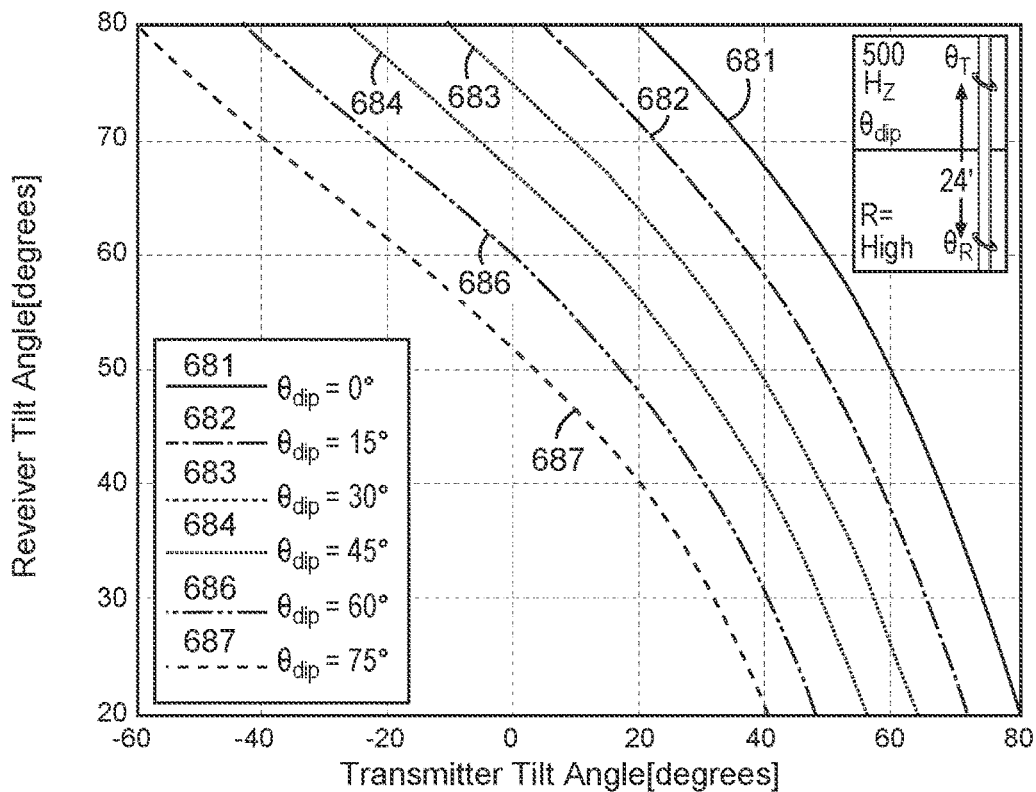
FIG. 6 shows tilt angle combinations that achieve layer signal cancellation effect for different dip angles, where the strike angle of the dip is aligned with dipoles, in accordance with various embodiments.

FIG. 6 shows tilt angle combinations that achieve layer signal cancellation effect for different dip angles, where strike angle of the dip is aligned with dipoles. The transmitter antenna-receiver antenna spacing is 24 ft with operation at 500 Hz in a high resistivity region. Curve 681 is for a dip angle of 30°. Curve 682 is for a dip angle of 15°. Curve 683 is for a dip angle of 30°. Curve 684 is for a dip angle of 45°. Curve 686 is for a dip angle of 60°. Curve 681 is for a dip angle of 75°. It can be seen from FIG. 6 that the cancellation method works up to approximately 60 degrees for a wide range of angle combinations for the configuration used. Multiple transmitters or receivers can be combined to achieve cancellation effect in a wider range. A cross-dipole or tri-axial tool can be used to synthesize dipole vectors at tilt angles that optimally cancel layer signals.

Figure 7:
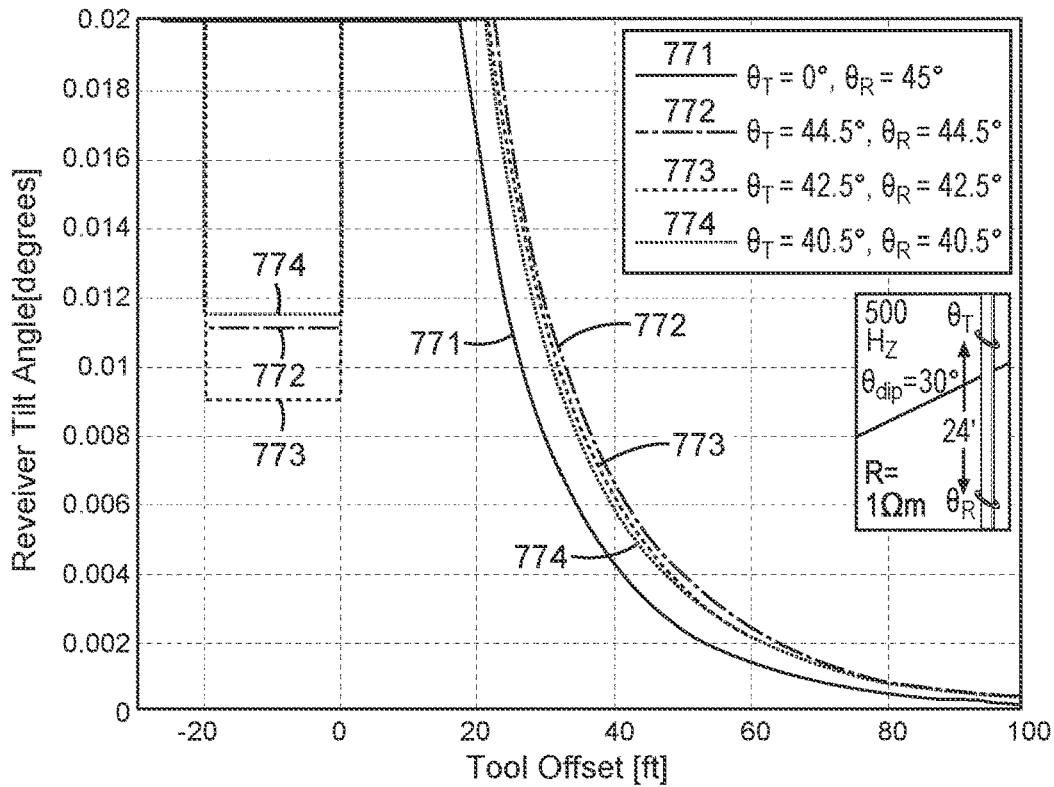
FIG. 7 shows integrated geometrical factors for a highly conductive medium, in accordance with various embodiments.

FIG. 7 shows integrated geometrical factors for a highly conductive medium. These factors are for a tool with a single transmitter, single receiver tool operating at a frequency of f=500 Hz with a spacing of $d_1$=24 feet at dip angle of $\theta_{dip}$=30° in a region having a resistance of R=1 ohm. Curve 771 is for a transmitter tilt angle of 0° and receiver tilt angle of 45°. Curve 772 is for a transmitter tilt angle of 44.5° and receiver tilt angle of 44.5°. Curve 773 is for a transmitter tilt angle of 42.5° and receiver tilt angle of 42.5°. Curve 774 is for a transmitter tilt angle of 40.5° and receiver tilt angle of 40.5°. Although very good cancellation can be achieved for any dipping angle for high resistivity background, a reduction in cancellation performance is observed in highly conductive medium as shown in FIG. 7. Here, the optimum performance is achieved at 42.5° as shown in curve 773. Operation at lower frequencies allows successful cancellation at higher conductivity values.

Figure 8:
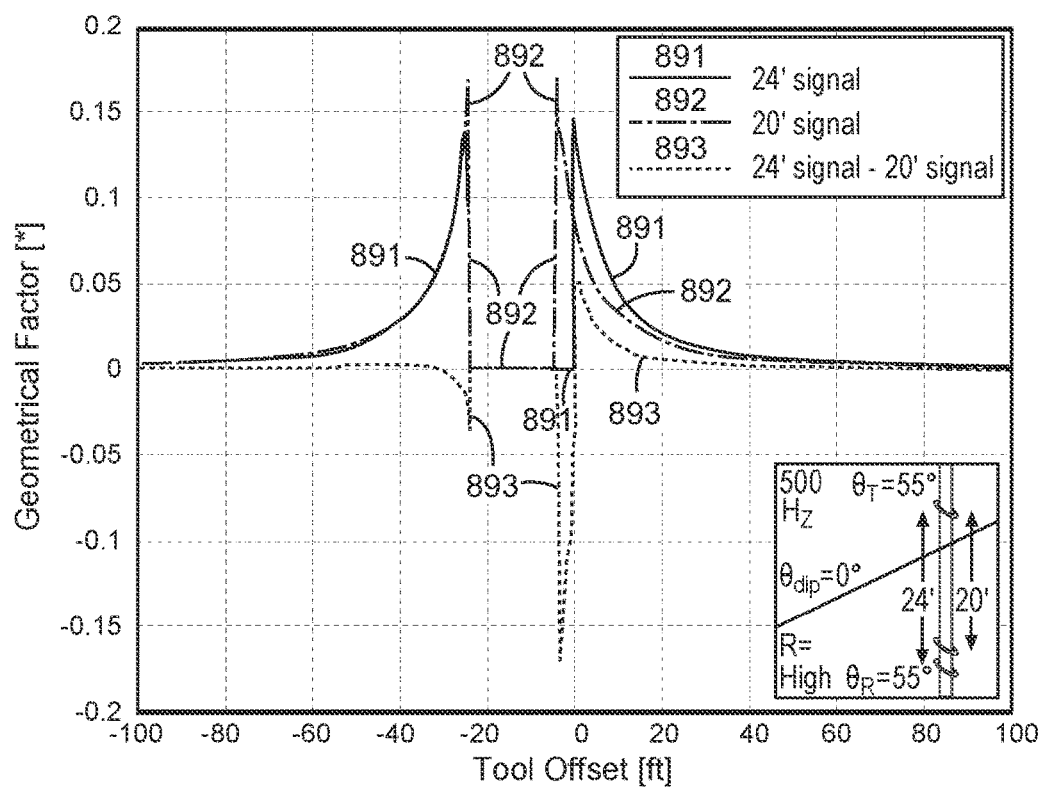
FIG. 8 shows geometrical factors associated with two different spacings, in accordance with various embodiments.

FIG. 8 shows geometrical factors associated with two different spacings. FIG. 8 also shows subtraction of geometrical factors associated with the two different spacings. These factors are for a tool operating at a frequency of f=500 Hz in a high resistivity region at a dip angle of $\theta_{dip}$=0° with a spacing of $d_1$=24 feet, having signal shown in curve 891, and a spacing of $d_1$=20 feet, having signal shown in curve 892. The geometrical factors for the 24 ft spacing are subtracted from the geometrical factors for the 20 ft spacing, indicated in curve 893. It can be seen from FIG. 8 that, by using the subtraction, geometrical factor can be minimized around the back of the tool and focused towards the front. Signals discussed herein are presented in terms of millimhos (mmho). Such signals can be obtained by multiplying the voltages by associated tool coefficients using well-known procedures.

Figures 9A, 9B, 9C:
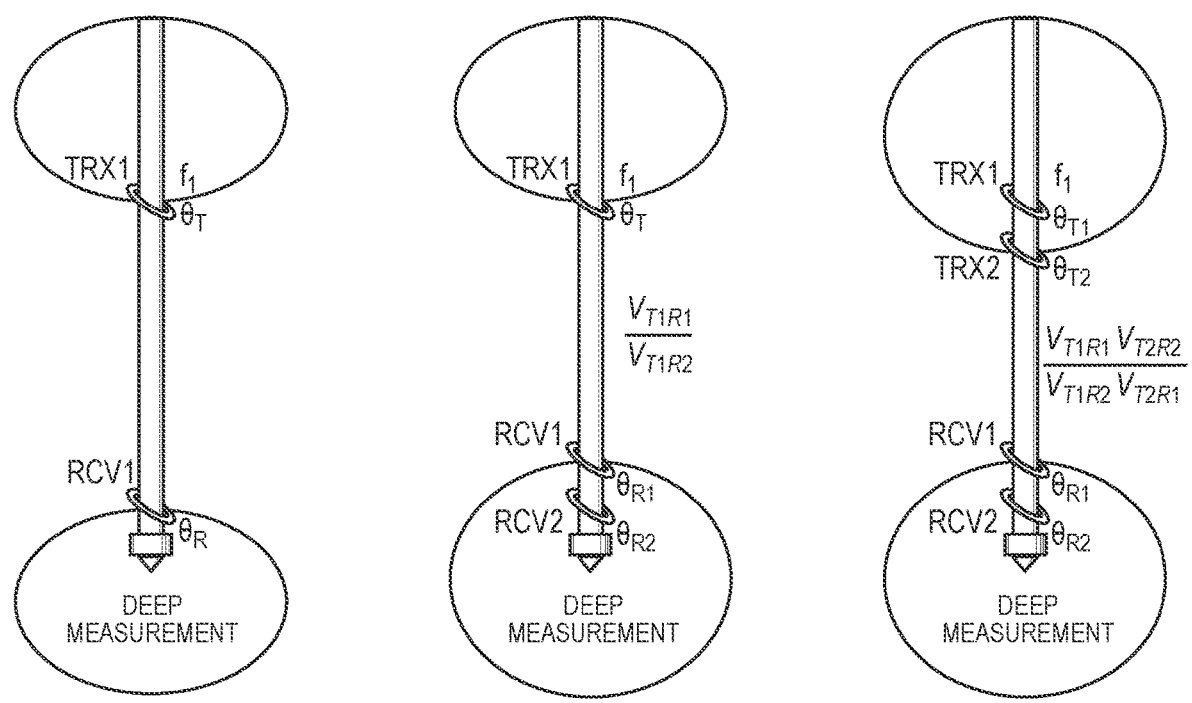
FIGS. 9A-9C show three examples of layer signal cancelling configurations and associated sensitivity regions, in accordance with various embodiments.

FIGS. 9A-9C show three embodiments of layer signal cancelling configurations and associated sensitivity regions. FIG. 9A relates an absolute measurement to a ratio measurement of FIG. 9B and to a compensated measurement of FIG. 9C. The ratio measurement in FIG. 9B may eliminate the need for calibration of the transmitter, since any multiplicative effect on transmitter signal is cancelled out. Tilt angle for both first and second receivers can be adjusted differently for cancellation. Simultaneous cancellation can be achieved at both receivers. The compensated measurement in FIG. 9C can further eliminate a requirement for calibration on both the transmitters and receivers, and can also remove the multiplicative temperature variations on the receivers. Simultaneous cancellation can be achieved at both receivers for both transmitters, especially when distance between antennas in front of the tool and back of the tool is kept small. In various embodiments, one of the antennas can be placed as close as possible to the bit to increase depth of detection ahead of the bit.

Figure 10A:
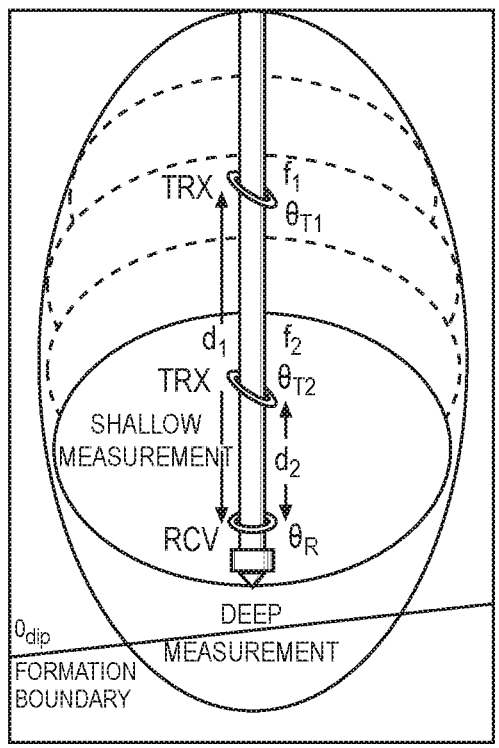
FIGS. 10A and 10B show examples of basic configurations of a deep measurement and a shallow measurement, in accordance with various embodiments.
Figure 10B:
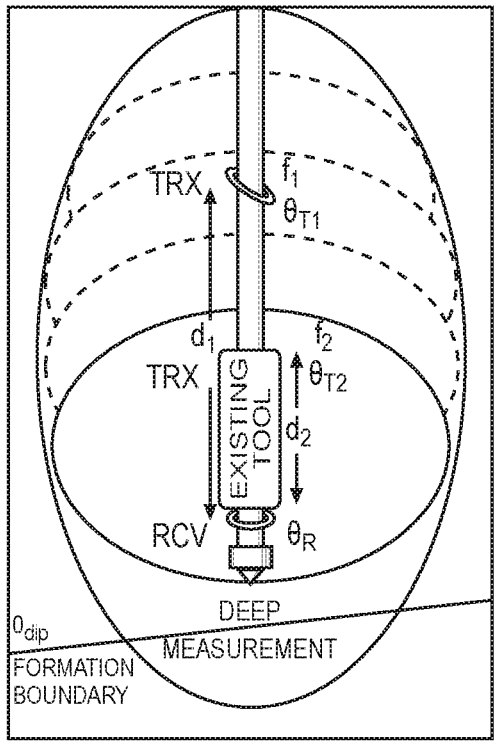

FIGS. 10A and 10B show examples of configurations of a deep measurement and a shallow measurement. In general, a total of four antennas can be used: a transmitter and a receiver for shallow measurements and a transmitter and a receiver for deep measurements. However, as shown in FIG. 10A, a common transmitter or receiver can be used to reduce the number of antenna elements. A deep measurement has a sensitivity that extends farther than a shallow measurement and receives signals earlier than the shallow measurement, as drilling commences. A deep measurement typically has longer transmitter-receiver spacing when compared to a shallow measurement; however, this is not absolutely required. Lower operating frequencies can provide for larger distances of investigation than higher frequencies for the same transmitter-receiver antenna pair. Typical transmitter/ receiver spacing for deep measurement is 20-100 feet, while the transmitter/receiver spacing for shallow measurement is 2 feet to 20 feet. Shallow spacing can be large enough to allow compensation for sensitivity to borehole and invasion effects. To ensure optimum focusing, shallow measurement should be made as close as possible to the drill bit. Deep sensitivity increases with increasing transmitter and receiver tilt angles, however this also amplifies borehole and mandrel effects. At least one of transmitter or receiver can be tilted to produce azimuthal sensitivity. Azimuthal sensitivity is important for a geosteering application, since it allows for determination of a distinction between signals coming from different directions. Typical frequency ranges for shallow and deep measurements include 500 Hz-10 MHz and 50 Hz-100 KHz, respectively. Multiple frequencies can be used for differentiating different deep layer distances. FIG. 10B indicates that an existing tool configuration, such as a commercially available tool, can be used for shallow or deep measurements. Such a tool can be realized by an azimuthal deep resistivity (ADR) sensor.

An ADR sensor having tilted antennas in an azimuthal array can acquire measurements in a number of discrete directions, called bins or bin directions, allowing for a number of different depths of investigation to determine distance and direction to multiple bed boundaries. For example, an ADR can be arranged with transmitters and receivers to use 32 discrete directions and 14 different depths of investigation. However, ADR arrangements can use more or less than 32 discrete directions and/or more or less than 14 different depths of investigation. An ADR sensor can add a dimension to measurements by using tilted receiver antennas and acquiring data from all possible transmitter-to-receiver spacings a number of times (corresponding to the number of bins) per tool revolution. Tilt of the receivers confers directional sensitivity to the array of ADR sensors. Deeper readings provided by the ADR can improve reaction time, allowing for increased drilling speed. An ADR sensor can provide fully compensated petrophysical-quality resistivity measurements and deep reading geosteering measurements combined in one tool to minimize bottom hole assembly (BHA) length. The azimuthal readings provide for derivation of anisotropy resistivity values, $R_h$ (horizontal) and $R_v$ (vertical), and dip.

Figure 11:
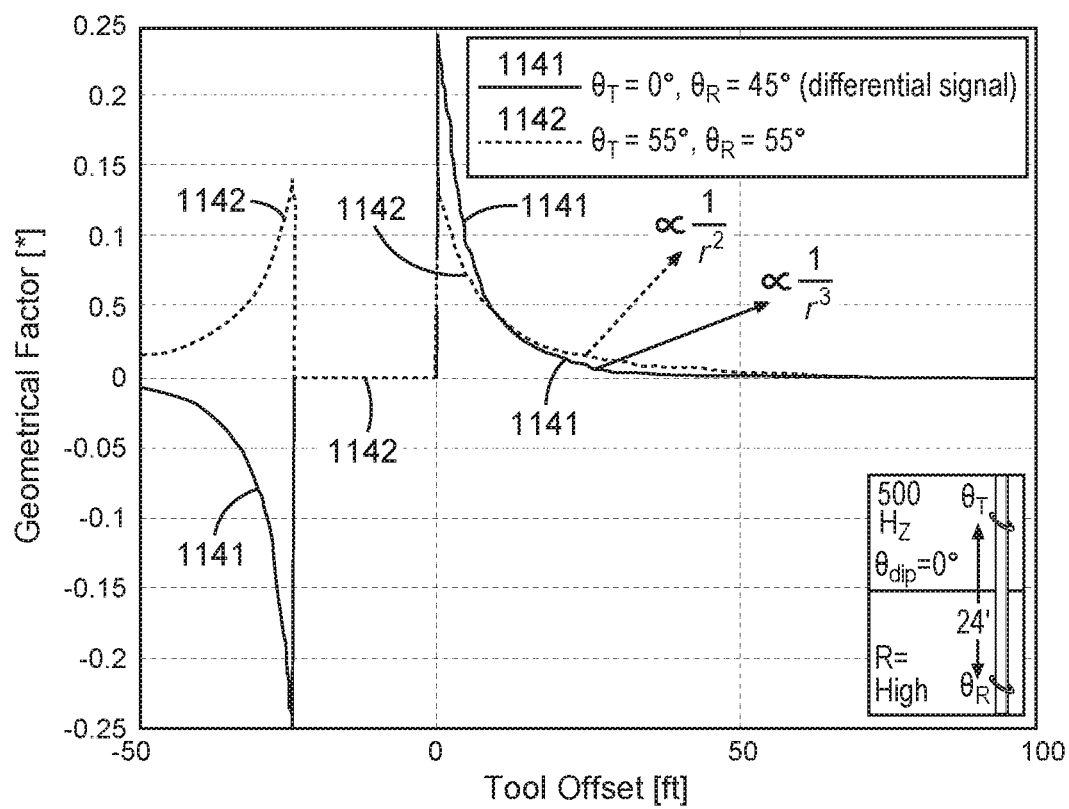
FIG. 11 shows a comparison of a time-lapse differential measurement versus a layer signal cancelling measurement, in accordance with various embodiments.

FIG. 11 shows a comparison of a time-lapse differential measurement versus a layer signal cancelling measurement. The layer signal cancelling measurement in this example is made with transmitter tilt angle and receiver tilt angle at 55° operating at 500 Hz in a high resistivity region, where its signal is represented by curve 1142. The time-lapse differential measurement in this example is made with transmitter tilt angle at 0° and receiver tilt angle at 45°, where the differential signal is represented by curve 1141. The time-lapse differential measurement can be calculated by subtracting the signal received at one tool position from another tool position 0.2 inches away. It can be seen from FIG. 11 that layer signal cancelling measurement can focus much deeper due to second order decay with respect to depth, when compared to third order decay of the differential time-lapse measurement.

Figure 12:
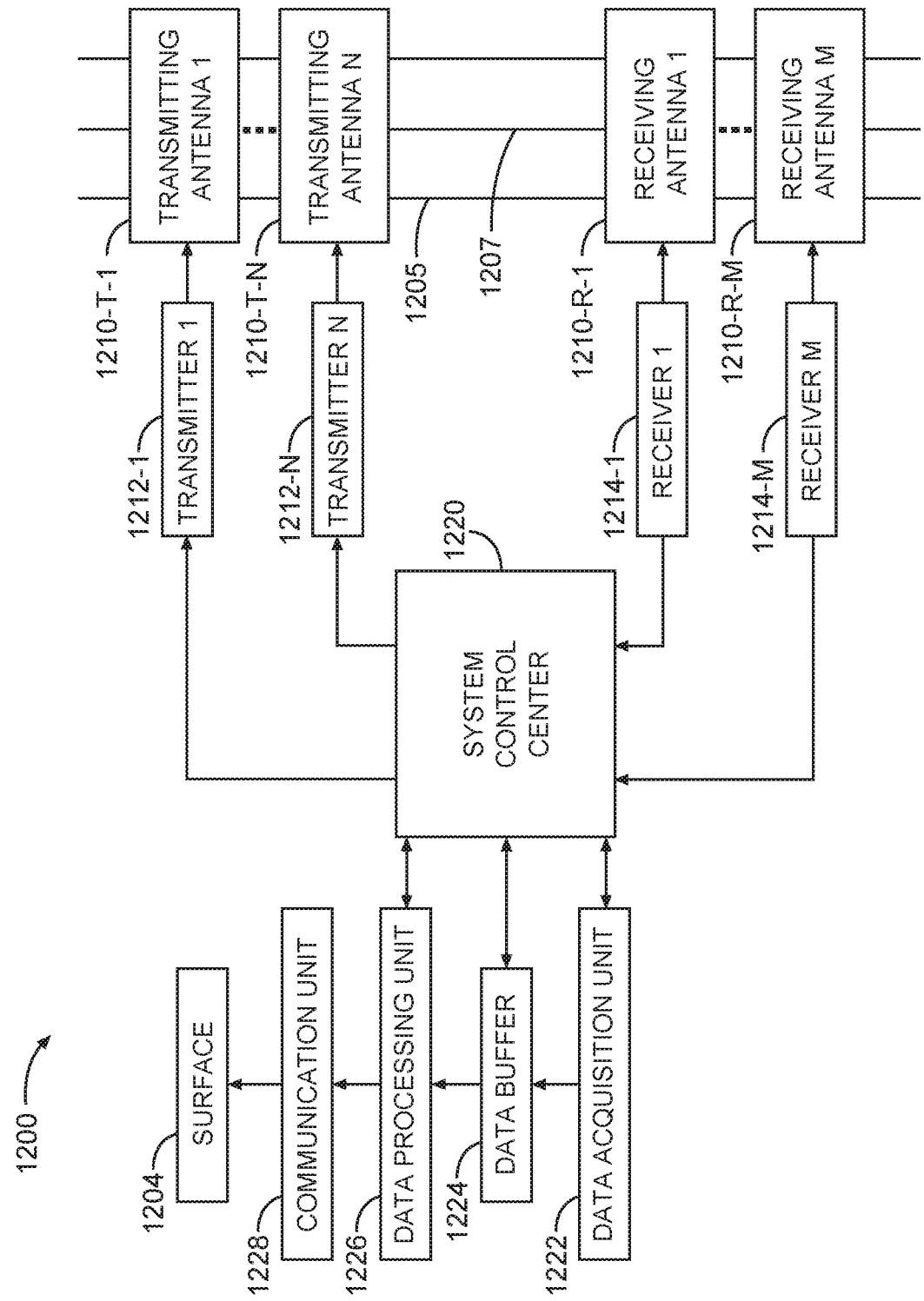
FIG. 12 shows an example data acquisition system, in accordance with various embodiments.

FIG. 12 shows a block diagram of an embodiment of an apparatus 1200, such as a data acquisition system, having a tool 1205 with transmitting antennas 1210-T–1 . . . 1210-T–N and receiving antennas 1210-R–1 . . . 1210-R–M, operable in a borehole in which tool 1205 is placed. Transmitting antennas 1210-T–1 . . . 1210-T–N and receiving antennas 1210-R–1 . . . 1210-R–M can be configured along tool 1005 such that each has a tilt angle with respect to longitudinal axis 1207 of tool 1005. Transmitter antennas or receiver antennas may have a tilt angle of zero degrees. At least one combination of a transmitting antenna and a receiving antenna can be arranged with tilt angles such that the transmitting antenna and the receiving antenna of the combination are arranged to cancel out signals from layers that are between the transmitting antenna and the receiving antenna of the combination and make tool 1205 insensitive to properties of the region to the side of tool 1205, when tool 1205 is operatively disposed downhole in a well. The tilt angles of the transmitting antenna and the receiving antenna of the combination can be different. At least one combination of a transmitting antenna and a receiving antenna can be arranged with tilt angles such that the transmitting antenna and the receiving antenna of the combination are arranged to cancel out signals from layers outside the region between the transmitting antenna and the receiving antenna of the combination, when tool 1205 is operatively disposed downhole in a well. The tilt angles of the transmitting antenna and the receiving antenna of the combination can be different. Transmitting antennas 1210-T–1 . . . 1210-T–N and receiving antennas 1210-R–1 . . . 1210-R–M may include collocation of antennas with different tilt angles in which one or more tilt angles are synthetically created and signal cancellation is realized synthetically. The synthetic cancellation can be for signals from layers between the collocated antennas or from signals from layers outside the region between the collocated multiple antennas.

Apparatus 1200 can include a system control center 1220, transmitters 1212-1 . . . 1210-N, receivers 1214-1 . . . 1214-M, a data acquisition unit 1222, a data buffer 1224, a data processing unit 1226, and a communication unit 1228 in addition to tool 1205 with transmitting antennas 1210-T–1 . . . 1210-T–N and receiving antennas 1210-R–1 . . . 1210-R–M. System control center 1220 can include a central processing unit (CPU), analog electronics, digital electronics, or various combinations thereof to manage operation of other units of apparatus 1200. System control center 1220 can generate a signal and feed the signal to transmitters 1212-1 . . . 1212-N. The signal can be generated within a frequency in range 100 Hz to 10 MHz. Other frequency ranges may be used. Transmitters 1212-1 . . . 1212-N can direct currents to transmitting antennas 1210-T–1 . . . 1210-T–N, which emit electromagnetic waves into the formation. Although tool 1205 is operable to cancel out signals from layers that are between the transmitting antenna and the receiving antenna of a selected combination and make tool 1205 insensitive to properties of the region to the side of tool 1205, multiple transmitting antennas can be used to gather additional data to improve sensing of formation parameters. For example, transmitting antennas at different distances to the receiving antennas may produce images with different depth and resolution. As another example, antennas with different tilt angles or orientations may be used to produce sensitivity to anisotropic formation parameters.

One of more of N transmitting antennas can be driven by the signal provided by system control center 1220. The signal may consist of a sine wave at the desired frequency for frequency domain applications. In a time domain application, the signal can be a pulse with a certain shape and frequency spectrum. The transmitters can be simultaneously or sequentially activated and they can be kept on for a time long enough to allow transients to die off and noise effects to diminish via stacking. The received signals can be transformed into a domain where incident portion of the signal can be separated from the reflected portion. One particular example for such transformation is Hilbert transform. The signals at the receivers are provided to system control center 1220, which can be stored at the data buffer 1224 before finally being communicated to the surface. System control center 1220 can also control or interfere with the geosteering operation essentially autonomously without consulting to the surface, so that decisions can be made with minimal delay.

Electromagnetic wave signals that are received at receiving antennas 1210-R-1 . . . 1210-R-M can be directed to corresponding receivers 1214-1 . . . 1214-M and system control center 1220. Operation of apparatus 1200 can include multiple frequencies being transmitted and received at the same time for better time utilization. In such an operation, a sinusoidal waveform, a square waveform, or other time-based waveforms may be used to excite multiple frequencies simultaneously at each transmitting antenna 1210-T-1 . . . 1210-T-M or individual frequencies at transmitter antennas 1210-T-1 . . . 1210-T-M. Received signals corresponding to the multiple frequencies can be separated by filters at the receiving end in data acquisition unit 1222. For each transmitting antenna 1210-T-1 . . . 1210-T-M, received signals at all receivers 1214-1 . . . 1214-M can be recorded. Data buffer 1224 can be used to store received signal for processing.

Data processing unit 1226 can be used to perform inversion or other processing on the data. The processing and the inversion can be continued in accordance with processing features similar to or identical to embodiments taught herein. Inversion operations can include a comparison of measurements to predictions of a model such that a value or spatial variation of a physical property can be determined. A conventional inversion operation can include determining a variation of electrical conductivity in a formation from measurements of induced electric and magnetic fields. Other techniques, such as a forward model, deal with calculating expected observed values with respect to an assumed model. In various embodiments, an inversion process, conducted with respect to apparatus 1200, may be performed downhole or in an analysis unit, such as a computer, at surface 1204 after the data is transferred to surface 1204. Communication unit 1228 can communicate the data or results to surface 1204 for observation and/or determination of subsequent action to be taken in a drilling operation related to the measurements taken with apparatus 1200. The data or results may also be communicated to other tools downhole and used to improve various aspects of locating and extracting hydrocarbons.

With the shallow and deep data obtained, it is possible to do brute-force inversion on a full set of received measurements. However, instead enhanced processing may be attained with a procedure to divide the whole operation into two parts: calculation of a look-ahead signal and calculation of formation layer properties from the look-ahead signal. This two-part approach allows interpretations directly from the look-ahead signal, even if solution for deep layer horizontal resistivity $R_h$, vertical resistivity $R_v$ and position is not unique.

Figure 13:
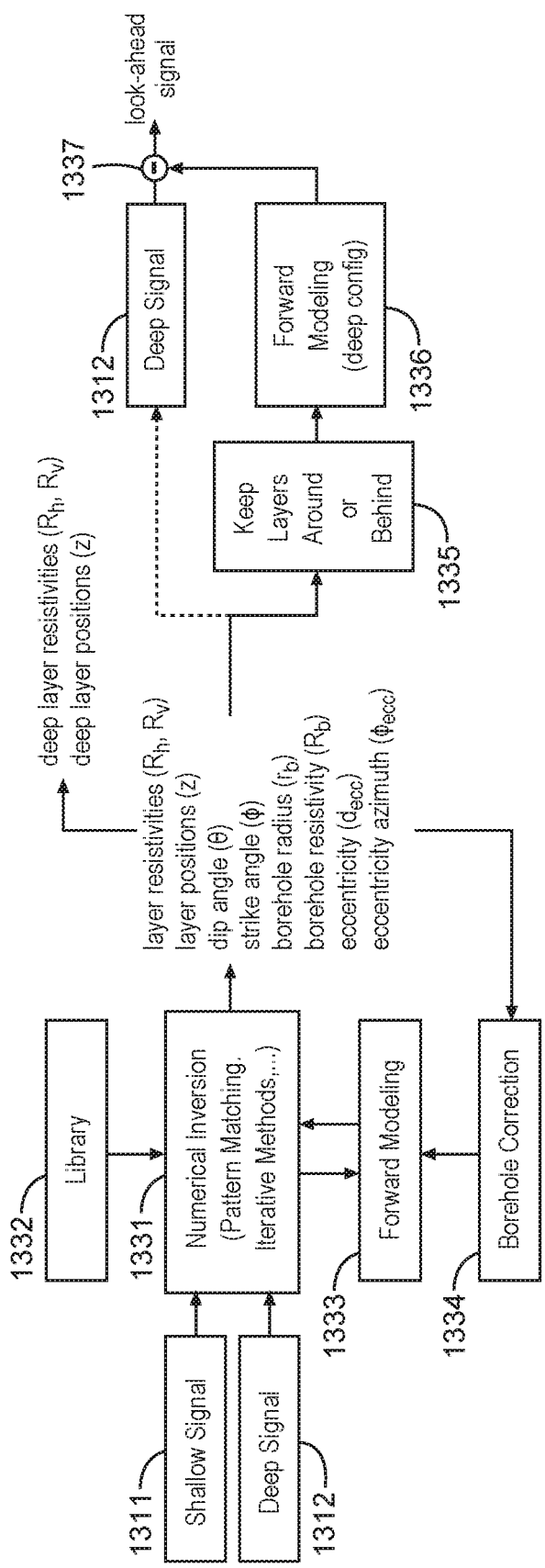
FIG. 13 shows features of an example method of calculation of look-ahead signal via shallow and deep inversion, in accordance with various embodiments.

FIG. 13 shows features of an example embodiment of a method of calculation of look-ahead signal via shallow and deep inversion. This calculation can take advantage of full inversion using both a shallow signal 1311 and a deep signal 1312. Shallow signal 1311 and deep signal 1312 can be provided for numerical inversion 1331. Numerical inversion 1331 can use a number of different conventional techniques including, but not limited to, pattern matching and iterative methods. A library 1332 and forward model 1333 can assist numerical inversion 1331. Inverted borehole parameters from borehole correction 1334 can be fed back to numerical inversion 1331 to obtain better estimates. Output from numerical inversion 1331 can include layer resistivities ($R_h$, $R_v$), layer positions (z), dip angle (θ), strike angle (φ), borehole radius ($r_b$), borehole resistivity ($R_b$), eccentricity ($d_{ecc}$), and eccentricity azimuth ($\varphi_{ecc}$). These parameters can be feedback to borehole correction 1334 to update borehole correction 1334. These factors can also be fed forward to provide data for layers around or behind the tool 1335 for further processing. Deep layer resistivities ($R_h$, $R_v$), deep layer positions (z) output from numerical inversion 1331 are not provided for determination of the look-ahead signal, the data kept for further processing with measured deep signal 1312 relates to layers around or behind the tool. Data for layers around or behind the tool 1335 can be provided for forward modeling 1336 to provide a deep configuration correlated to the layers around or behind the tool. Output from forward modeling 1336 provides a modeled signal that is an anticipated deep signal from the layers around the tool, which can be directed to subtraction node 1337. A look-ahead signal can be obtained by subtracting an anticipated deep signal from the layers around the tool from the measured deep signal.

Figure 14:
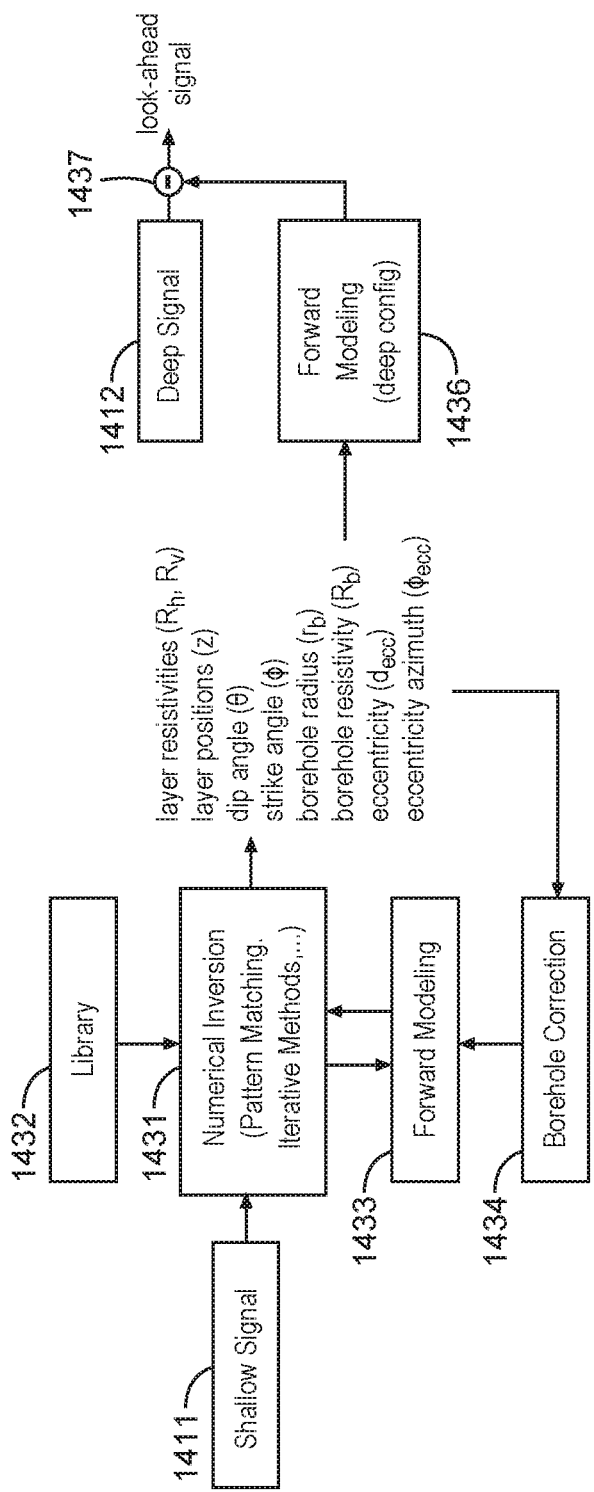
FIG. 14 shows features of an example method of the look-ahead signal calculation by using only shallow signals, in accordance with various embodiments.

FIG. 14 shows features of an example embodiment of a method of the look-ahead signal calculation by using only a shallow signal 1411. In this case, inverted layers are all near the tool since shallow measurement is mostly sensitive near the tool. Shallow signal 1411 can be provided for numerical inversion 1431. Numerical inversion 1431 can use a number of different conventional techniques including, but not limited to, pattern matching and iterative methods. A library 1432 and forward model 1433 can assist numerical inversion 1431. Inverted borehole parameters from borehole correction 1434 can be fed back to numerical inversion 1431 to obtain better estimates. Output from numerical inversion 1431 can include layer resistivities ($R_h$, $R_v$), layer positions (z), dip angle (θ), strike angle (φ), borehole radius ($r_b$), borehole resistivity ($R_b$), eccentricity ($d_{ecc}$), and eccentricity azimuth ($\varphi_{ecc}$). These parameters can be feedback to borehole correction 1434 to update borehole correction 1434. These factors can also be fed to forward modeling 1436 with the deep configuration to yield a signal that only includes layers near the tool. Output from forward modeling 1436 provides a modeled signal that only includes layers near the tool, which can be directed to subtraction node 1437. As a result, when the modeled signal is subtracted from the measured deep signal 1412, the look-ahead signal can be obtained.

Figure 15:
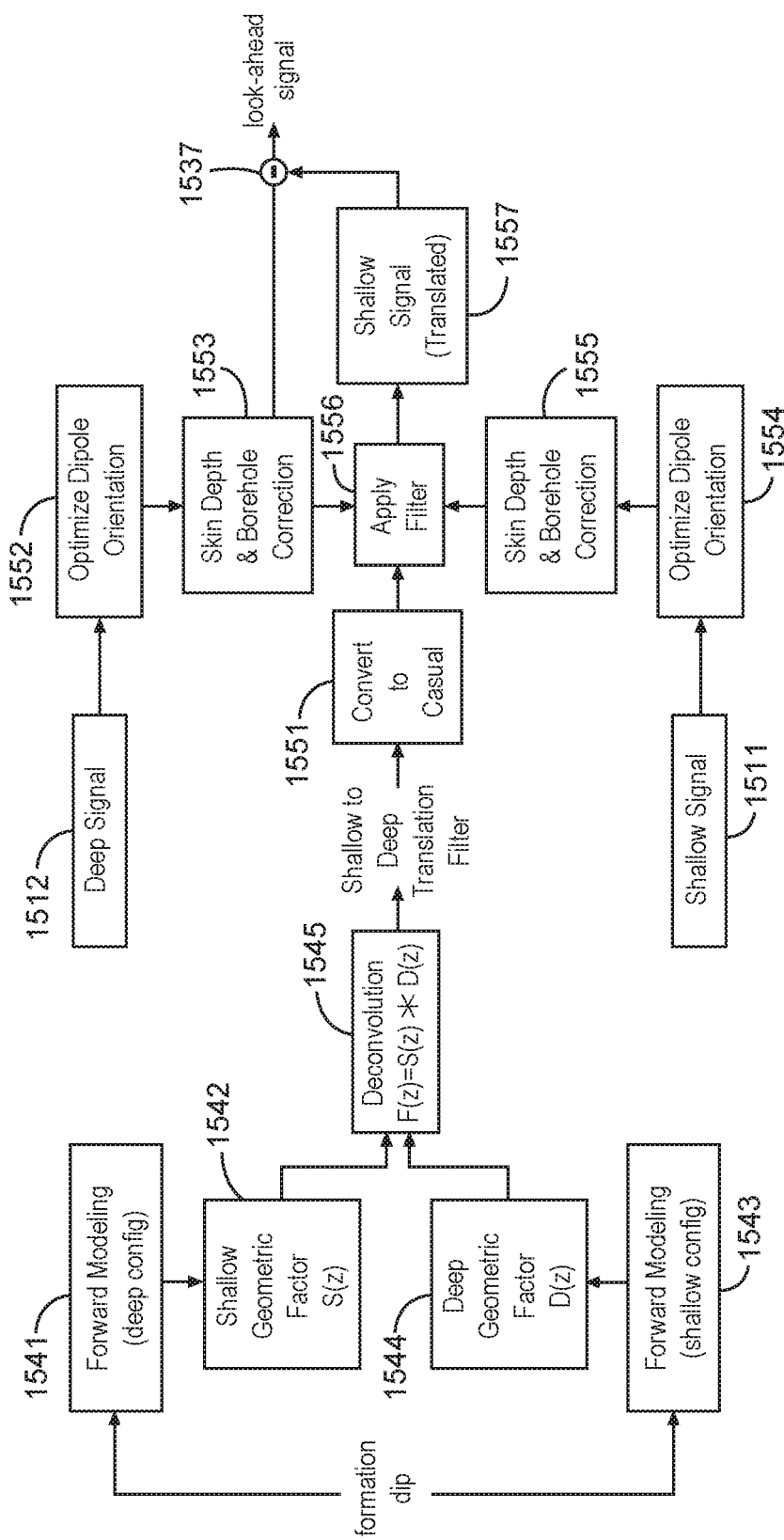
FIG. 15 illustrates an example calculation of a look-ahead signal via deconvolution, in accordance with various embodiments.

FIG. 15 illustrates an example embodiment of a calculation of look-ahead signal via deconvolution. Such a look-ahead signal calculation can be performed in a manner that does not involve an inversion. In this case, forward modeling 1541 can be performed to obtain shallow geometrical factors 1542 as a function of depth, associated with deep configurations. Forward modeling 1543 can be performed to obtain deep geometrical factors 1544 as a function of depth, associated with shallow configurations. The formation dip may be provided to forward modeling 1541 and forward modeling 1543. One way to obtain the geometric factor is to perform a synthetic log of a formation that consists of a background resistivity and a very thin layer at depth 0. Background resistivity is assumed to be sufficiently larger compared to inverse of the frequency, in which case, no significant skin effect is observed. The method illustrated in FIG. 15 is also expected to work when there are some skin effects, but such method uses custom geometric factors to be calculated with the specific resistivity. However, resulting look-ahead signal may be contaminated by shallow signal due to non-linearity induced by the skin effect.

After geometrical factors are computed, a filter is calculated by deconvolving a shallow geometric factor from a deep geometric factor 1545. In geosteering applications, there is no access to future signal values, so filter can be converted to causal 1551, for example, by enforcing zero values on the future side of the filter and adding a sum of removed values to the last available filter coefficient. In situations where dipole orientations of the transmitter and receiver are not optimal (for example, if they do not provide good layer signal cancellation), the transmitter and receiver can be rotated to any angle provided that cross-dipole measurements can be made to optimize dipole orientation 1552 for deep signal 1512 and to optimize dipole orientation 1554 for shallow signal 1511. In situations where transmitting or receiving antennas are rotating, the resulting different antenna dipole orientations can be combined for similar optimization.

Filter application 1556 to shallow signal equalizes its resolution and centering to the deep measurement providing a translated shallow signal 1157. This allows effective subtraction of the shallow signal from the deep signal, at subtraction node 1537, without creating effects due to resolution difference. A skin depth and borehole correction procedure 1555 for shallow signal 1511 and a skin depth and borehole correction procedure 1553 for deep signal 1512 can also be applied before subtraction and filtering to remove, and hence equalize, skin depth and borehole effects. The above methodology is free of inversion and it can work even in situations where inversion is not supposed to work very well. The methodology can be processed very quickly to be applied while geosteering, since the biggest computational part is the filter application.

Figure 16:
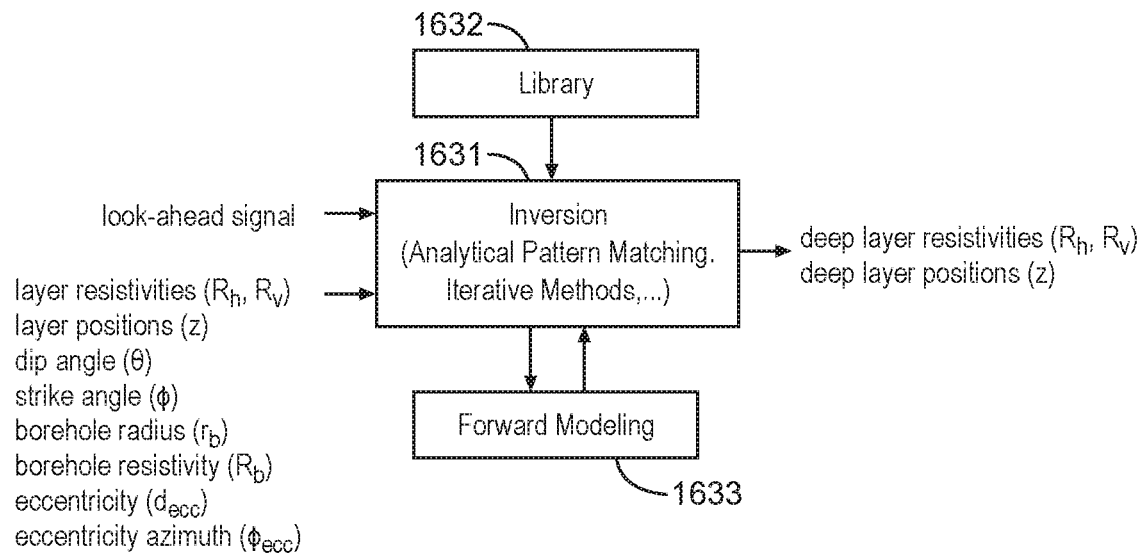
FIG. 16 illustrates an example calculation of deep layer properties via full inversion, in accordance with various embodiments.

FIG. 16 illustrates an example embodiment of a calculation of deep layer properties via full inversion. Even though look-ahead signal alone can be useful in applications, it may be desired to calculate resistivity and position of the layers ahead of the bit. This can be performed by an inversion algorithm that takes into account all known information such as around the tool layer parameters, as shown in FIG. 16. A look-ahead signal can be provided for inversion 1631 along with near tool parameters such as layer resistivities ($R_h$, $R_v$), layer positions (z), dip angle (θ), strike angle (φ), borehole radius ($r_b$), borehole resistivity ($R_b$), eccentricity ($d_{ecc}$), and eccentricity azimuth ($\varphi_{ecc}$). A library 1632 and forward model 1633 can assist inversion 1631. Inversion 1631 can include using one or more techniques, such as but not limited to, analytical formulas, pattern matching, and iterative methods to output deep layer resistivities ($R_h$, $R_v$) and deep layer positions (z).

Figure 17:
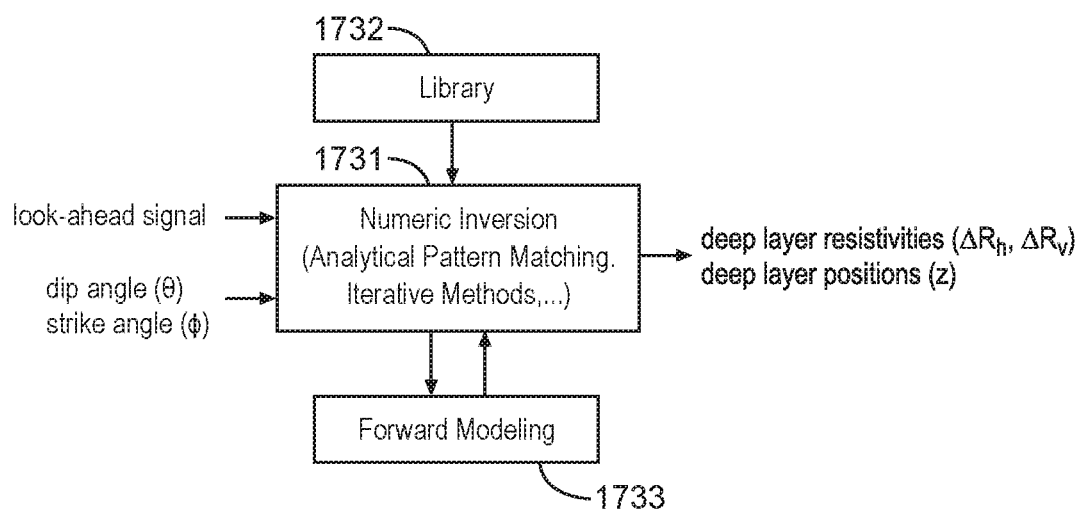
FIG. 17 illustrates an example calculation of deep layer properties via simple inversion, in accordance with various embodiments.

FIG. 17 illustrates an example embodiment of a calculation of deep layer properties via simple inversion. In cases where only the dip angle (θ) and the strike angle (φ) are known, the resistivity change and layer position can be obtained by inversion as shown in FIG. 17. A look-ahead signal can be provided for inversion 1731 along with dip angle (θ) and strike angle (φ). A library 1732 and forward model 1733 can assist inversion 1731. Inversion 1731 can include using one or more techniques, such as but not limited to, analytical formulas, pattern matching, and iterative methods to output deep layer resistivities ($R_h$, $R_v$) and deep layer positions (z). Since the geometrical factor is inversely proportional to square of the distance to layer boundary, analytical formulas can be utilized for inversion. Since large resistivity changes may indicate large pressure changes, results from this calculation may be used in stopping the drilling for safety before approaching dangerous zones.

Figure 18:
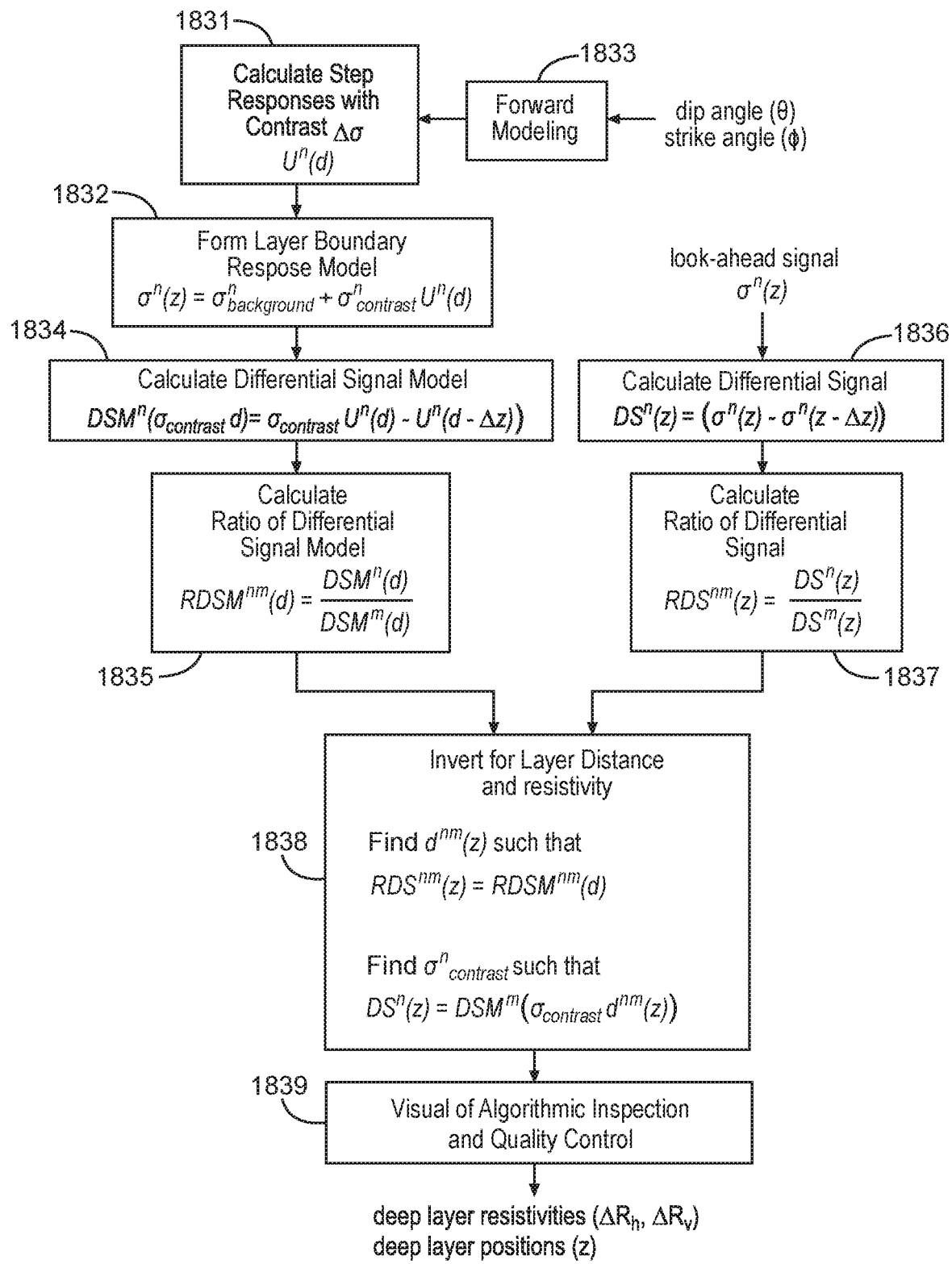
FIG. 18 illustrates an example of a calculation of deep layer properties via inversion, in accordance with various embodiments.

FIG. 18 illustrates an example embodiment of a calculation of deep layer properties via inversion. The calculation method shown in FIG. 18 can be used to invert distance and resistivity of layers. The calculation may begin with dip angle (θ) and strike angle (φ) provided for forward modeling 1833. If skin depth is sufficiently small or it can be sufficiently compensated, there is an approximately linear relationship between the conductivity at each layer and the signal that it generates at the receivers. As a result, given the signal due to a small perturbation on the conductivity distribution, what the signal contribution would be for a layer with any conductivity can be predicted. For that purpose, at 1831 from forward modeling 1833, a step response, $U^n(d)$, can be generated by synthetically logging a two layer formation, where only a very small contrast of Δσ exists in between layer conductivities. At 1832, based on the linearity property, the total signal at a n'th measurement at depth z in a case with a single layer perturbation can be written as $$\sigma^n(z) = \sigma^n_{background} + \sigma^n_{contrast} U^n(d), \quad (1)$$

where $\sigma_{contrast}$ is the conductivity difference between the layer that the tool is in and the layer that is ahead of the tool, and $\sigma_{background}$ is the conductivity due to the layer that the tool is current in. At 1834, in order to remove the effect of unknown background, a differential signal can be calculated $$DSM^n(\sigma_{contrast}, d) = \sigma_{contrast}(U^n(d) - U^n(d-\Delta z)) \quad (2)$$

At 1835, effect of conductivity contrast can be removed by considering a ratio of differential signals from the n'th and m'th measurements as follows $$RDSM^{nm}(d) = \frac{DSM^n(d)}{DSM^m(d)} \quad (3)$$

A look-ahead signal, $\sigma^n(z)$, at a n'th measurement at depth z can be provided, at 1836, to calculate differential signal $DS^n(z) = (\sigma^n(z) - \sigma^n(z-\Delta z))$. At 1837, a ratio of a differential signal can be calculated using the result from 1836 as $RDS^{nm}(z) = DS^n(z)/DS^m(z)$. At 1838, as shown in FIG. 16, a differential signal obtained from the measurements can be inverted for distance, $d^{nm}(z)$, and conductivity, $\sigma^n_{contrast}(z)$, of the layers ahead of the tool by using the relationships in equations 1-3. Distance $d^{nm}(z)$ can be found such that $RDS^{nm}(z) = RDSM^{nm}(d)$. Conductivity $\sigma^n_{contrast}(z)$ can be found such that $DS^n(z) = DSM^n(\sigma^n_{contrast}, d^{nm}(z))$. Each estimation with different n and m produces results with different depth of detection and the optimum measurements can be visually or algorithmically picked, at 1839. Deep layer resistivities ($R_h$, $R_v$) and deep layer positions (z) can be output from this inversion process. When the tool is far from the boundary, only deep measurement is expected to produce good results. As the tool gets closer to the boundary, measurements with lower depth of detection can be valid. The processing disclosed in FIG. 18 requires the layer boundary to be in range of at least two different measurements. Although deep measurements can see deeper, shallow measurements can be more accurate since they are less affected by boundaries of multiple layers.

Figure 19:
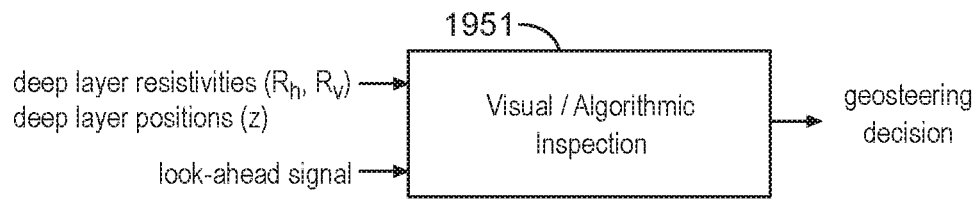
FIG. 19 illustrates an example of a geosteering decision chart, in accordance with various embodiments.

In various embodiments, the processing schemes taught herein can be repeated and new measurements can be added as the tool drills/moves. FIG. 19 illustrates an example embodiment of a geosteering decision chart. A look-ahead signal along with deep layer resistivities ($R_h$, $R_v$) and deep layer positions (z) can be provided for visual and/or algorithmic inspection 151 from which a geosteering decision can be made. Geosteering decisions can be made by a person who is observing the results of the processing of the measurements at the surface. Alternatively, geosteering decisions can be made downhole by an automated system. An automated system can respond much more quickly, due to inherent lags associated with downhole telemetry to provide data to the surface. The look-ahead signal is proportional to the strength of the resistivity contrast and distance of the change. As a result, the look-ahead signal can give useful indication about the nature of the approaching layers. Since deep layers that are far with large contrast create very similar signal with near layers with small resistivity contrast, it may be difficult in some cases to find unique results for resistivity and distance. In such cases, the look-ahead signal itself can be used for making a decision. Another alternative is to use a-priori knowledge about layer resistivities or distances to remove the non-uniqueness problem.

Existing efforts in the literature have focused on increasing sensitivity ahead of the tool, but reduction of sensitivity around the tool has not been addressed. As a result, existing tools receive a mix of signals from around and ahead of the tool, which is either very difficult or not possible to separate. In various embodiments, special antenna tilt angles to achieve layer signal cancellation effect on the layers between the transmitters and receivers can be utilized. This essentially completely eliminates the sensitivity to those layers. Furthermore, an alternative method that utilizes deconvolution and inversion of multiple spacing data to reduce sensitivity to layers that are near the tool can be used. The resulting method can provide look-ahead capability in practical scenarios with multiple layers of varying resistivities, as opposed to the methods that suffer significant difficulties and complications.

Figure 20:
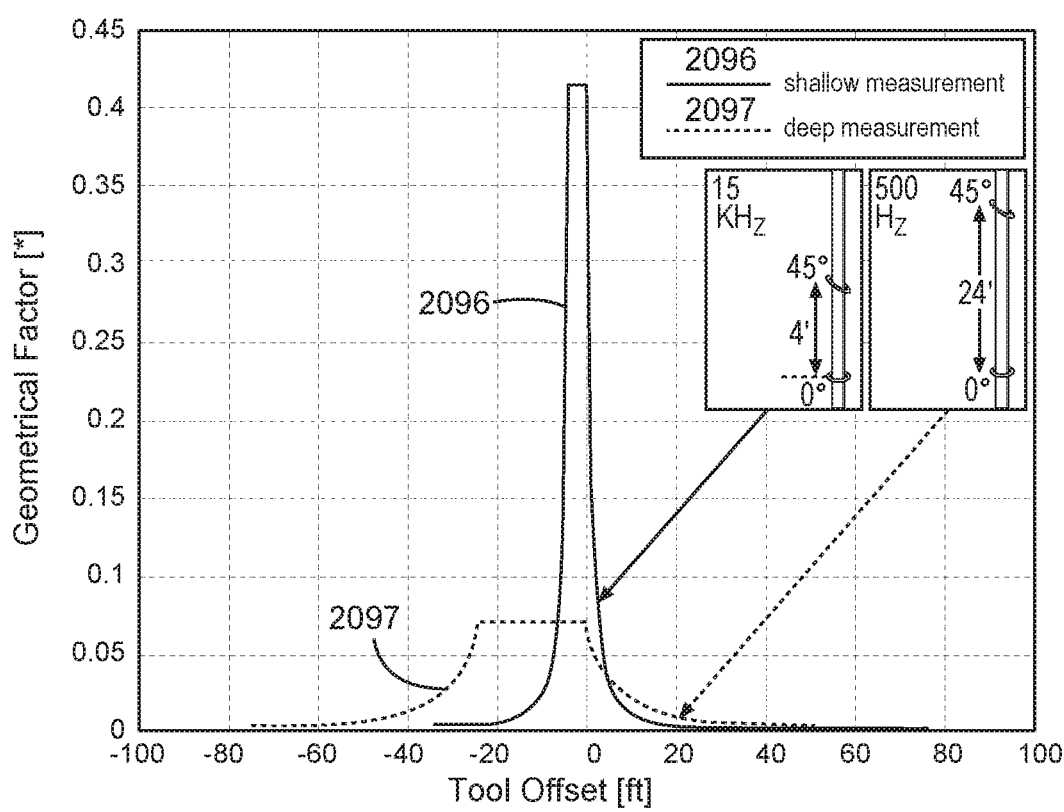
FIG. 20 shows geometric factors associated with two different spacings between transmitter and receiver, in accordance with various embodiments.
Figure 21:
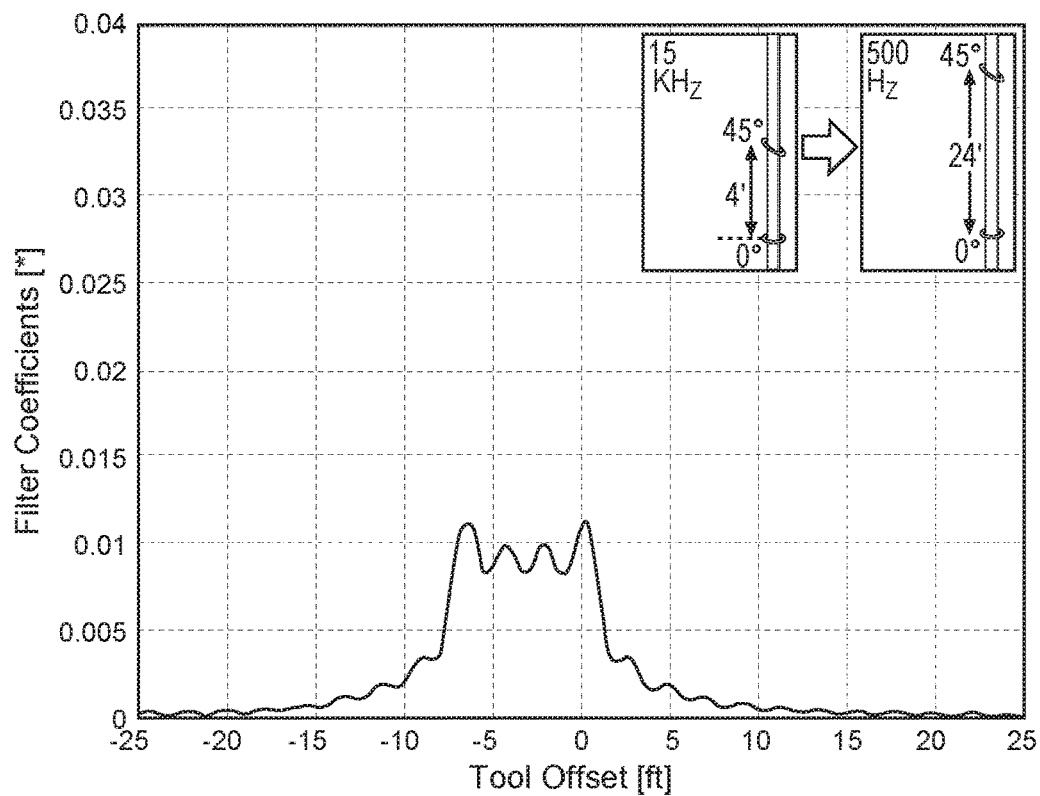
FIG. 21 illustrates a non-causal deconvolution filter, in accordance with various embodiments.
Figure 22:
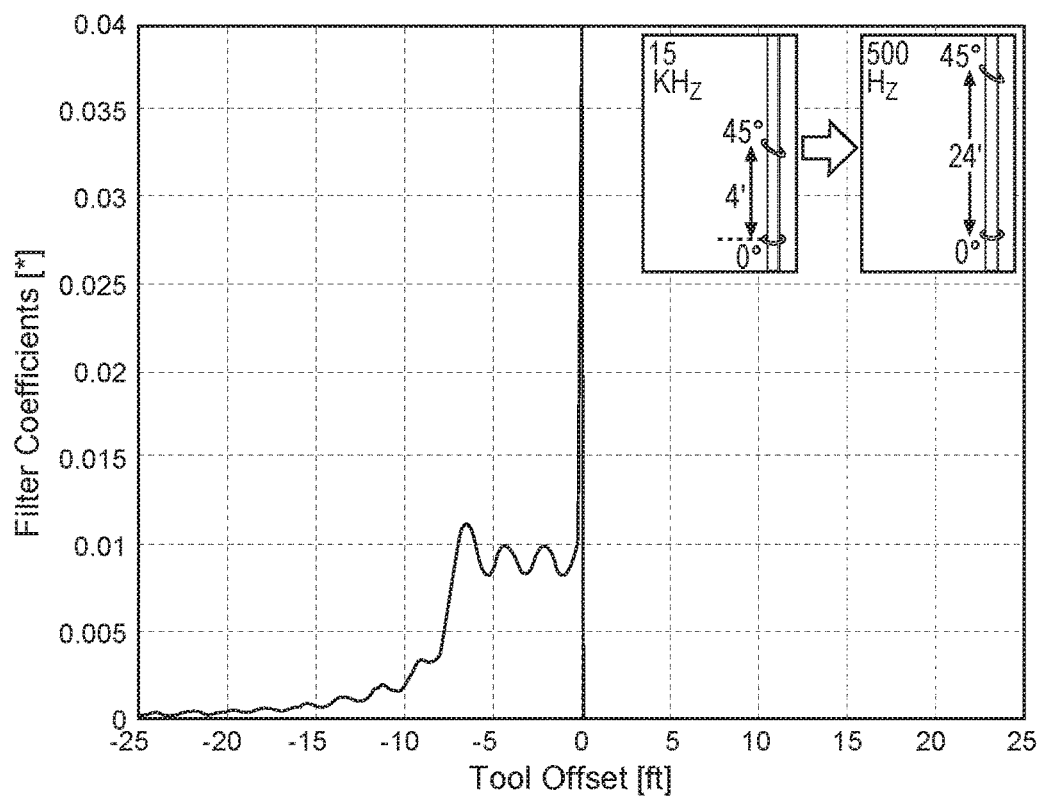
FIG. 22 illustrates a causal deconvolution filter, in accordance with various embodiments.

FIG. 20 shows geometric factors associated with two different spacings between transmitter and receiver. In this example, a 4 ft. spacing is used for a shallow measurement operating at 15 kHz with an antenna tilted at 45° and an antenna tilted at 0° having signal shown in curve 2096. A 24 ft. spacing is used for a deep measurement operating at 500 Hz with an antenna tilted at 45° and an antenna tilted at 0° having signal shown in curve 2097. The tool offset is defined as the true vertical position of the tool along the z-axis, where z-axis is pointing upward. It can be seen from FIG. 20 that the deep measurement is more sensitive to deep positions (z>0). The sensitivity is maximum and constant when the layer boundary is between the transmitter and the receiver (−4<z<0 for shallow measurements and −24<z<0 for deep measurements). The deconvolution filter is calculated from these two curves as shown in FIG. 21, which illustrates a non-causal deconvolution filter. This filter is made causal as shown in FIG. 22.

Figure 23:
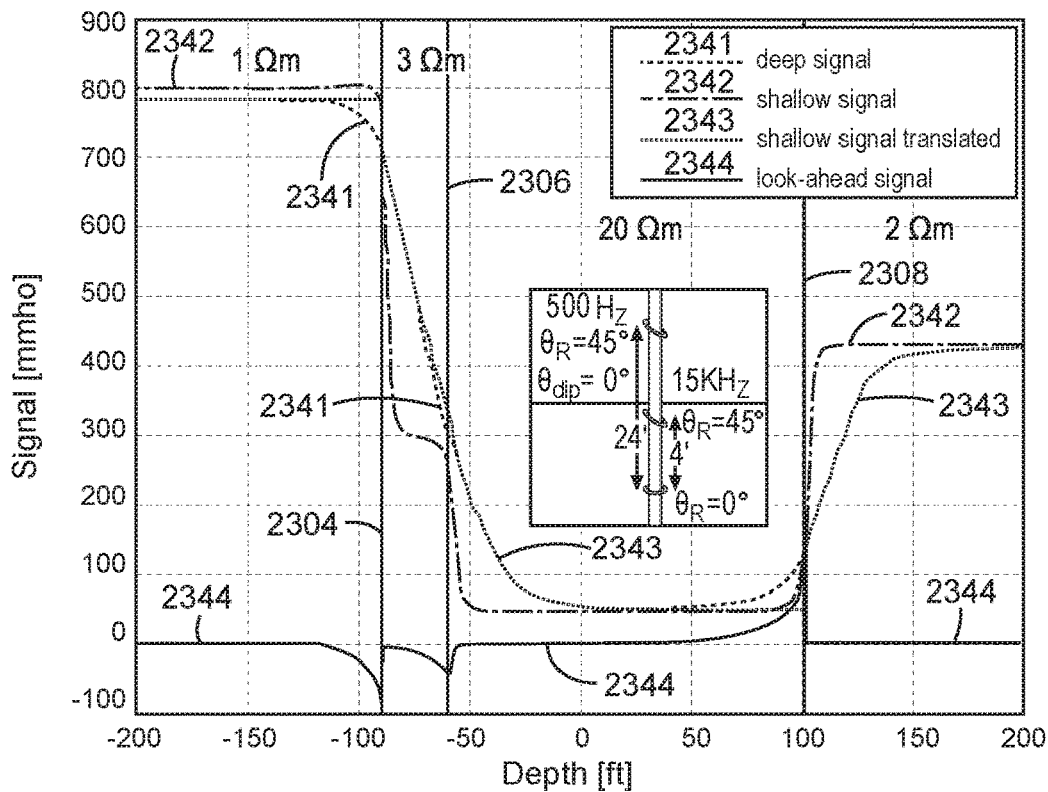
FIGS. 23 and 24 each shows a synthetic log with a zero dip angle and four layers in an inversion process, in accordance with various embodiments.
Figure 24:
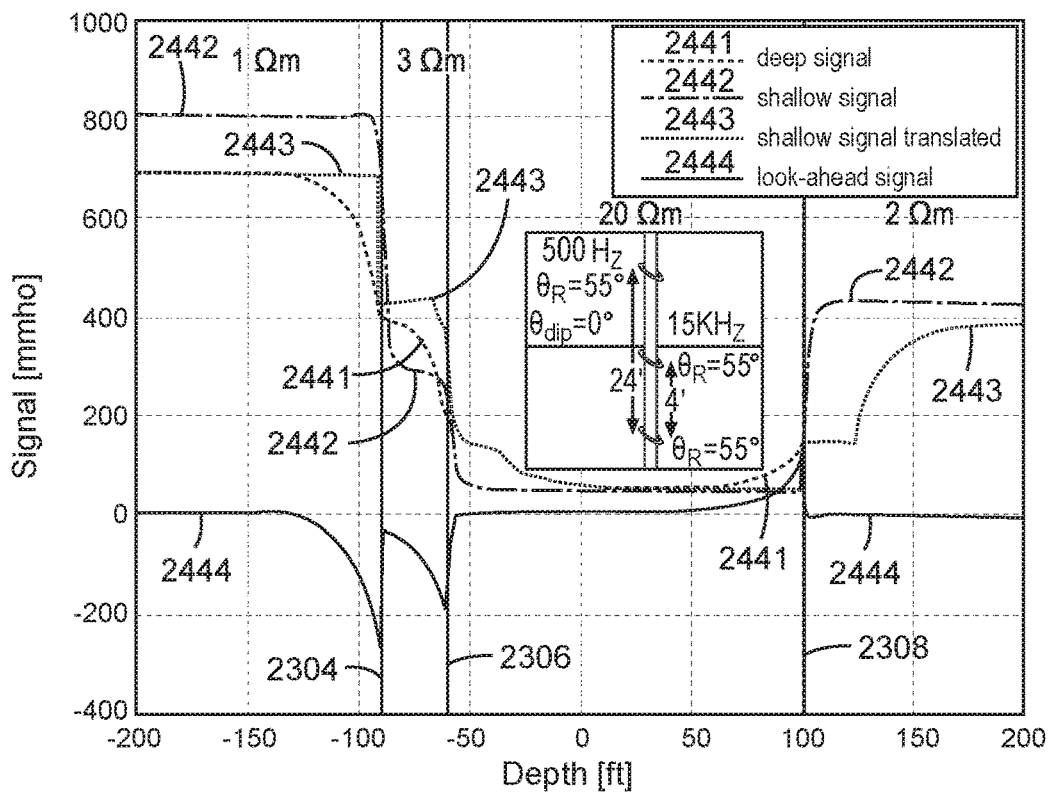

FIG. 23 and FIG. 24 each shows a synthetic log with a zero dip angle and four layers in an inversion process. Layer boundaries are shown as vertical lines 2304, 2306, and 2308 with the resistivity of each layer indicated in each region. FIG. 23 shows a transmitter operating at 500 Hz with tilt angle of 45° with a spacing of 24 ft. to receiver antenna having tilt angle of 0° and a transmitter operating at 15 KHz with tilt angle of 45° with a spacing of 4 ft. to the same receiver antenna. Curve 2341 shows a deep signal. Curve 2342 shows a shallow signal. Curve 2343 shows a shallow signal translated. Curve 2344 shows a look-head signal. FIG. 24 shows a transmitter operating at 500 Hz with tilt angle of 55° with a spacing of 24 ft. to receiver antenna having tilt angle of 55° and a transmitter operating at 15 KHz with tilt angle of 55° with a spacing of 4 ft. to the same receiver antenna. Curve 2441 shows a deep signal. Curve 2442 shows a shallow signal. Curve 2443 shows a shallow signal translated. Curve 2444 shows a look-head signal. The tool is assumed to move from z=200 ft to z=−200 ft, where the depth is defined as −z. The inversion method shown in FIG. 14 is used for translated shallow and look-ahead signal calculations. It can be seen that the look-ahead signal clearly indicates approaching layers, where higher signal is produced for higher resistivity contrast. Distance and resistivity of the approaching layer can be determined from inversion by taking advantage of the look-ahead curve profile as discussed earlier. Although a single spacing provides adequate information for such inversion, higher accuracy can be obtained by utilizing multiple deep spacings. Much higher signal levels are obtained in FIG. 24, where both transmitting and receiving antennas are tilted to achieve layer signal cancellation and deep focusing.

Figure 25:
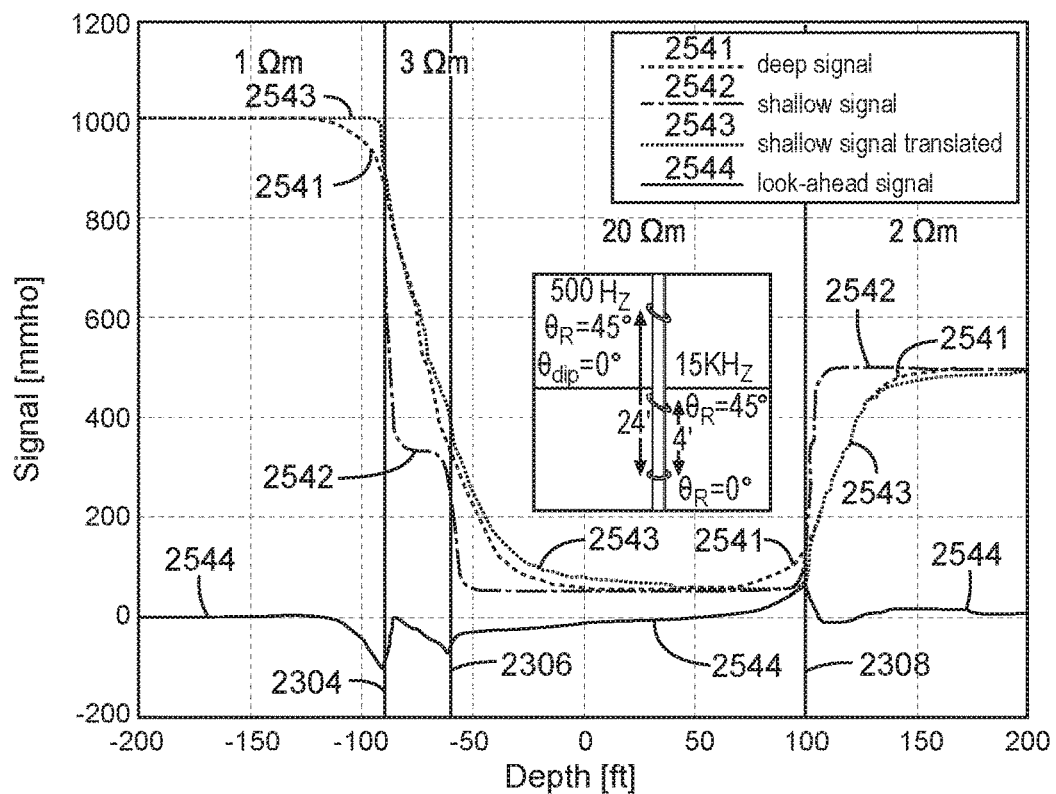
FIG. 25 shows a synthetic log with four layers in a deconvolution process, in accordance with various embodiments.

FIG. 25 shows the results obtained for the configuration of FIG. 23 with the deconvolution methodology described in FIG. 15. FIG. 25 shows a transmitter operating at 500 Hz with tilt angle of 45° with a spacing of 24 ft. to receiver antenna having tilt angle of 0° and a transmitter operating at 15 KHz with tilt angle of 45° with a spacing of 4 ft. to the same receiver antenna. Curve 2541 shows a deep signal. Curve 2542 shows a shallow signal. Curve 2543 shows a shallow signal translated. Curve 2544 shows a look-head signal. Comparable results are obtained with the inversion method result, however some noise due to causal implementation and skin depth effects is observed.

Figure 26:
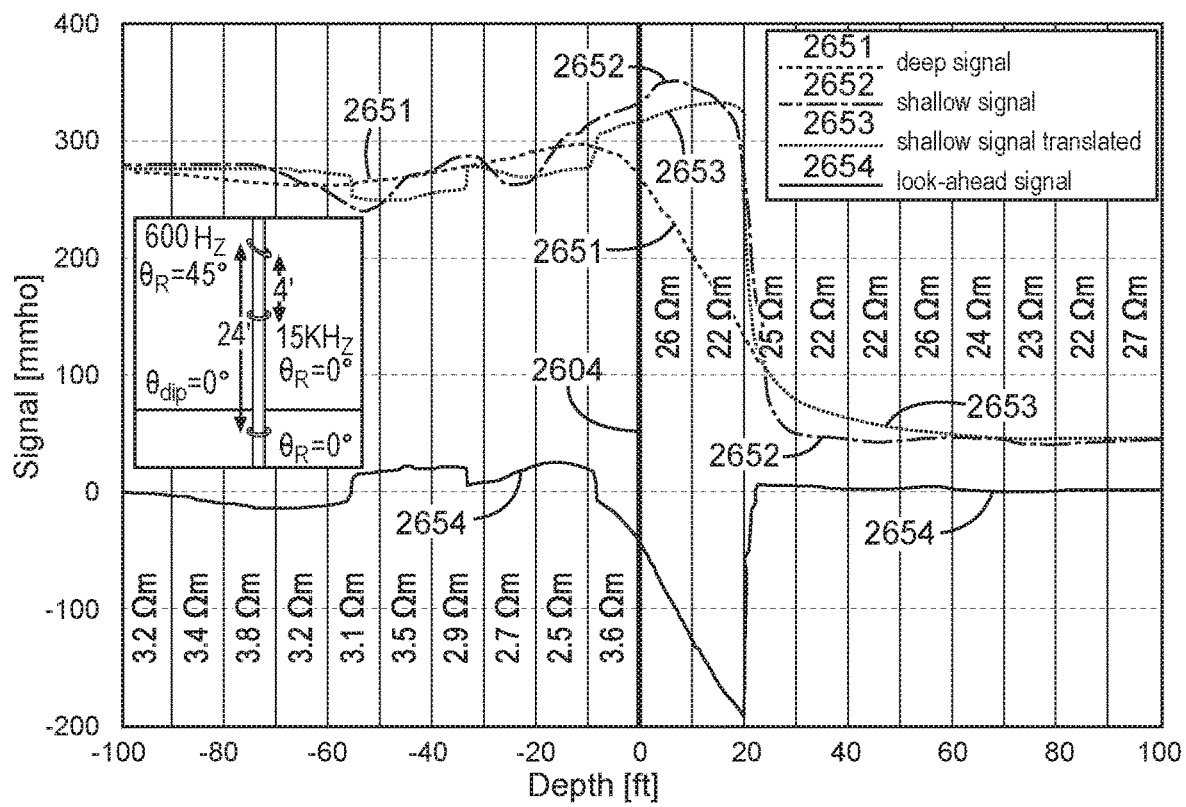
FIGS. 26 and 27 compare standard and layer signal cancelling configurations for a case with a large number of layers with resistivity variation, in accordance with various embodiments.
Figure 27:
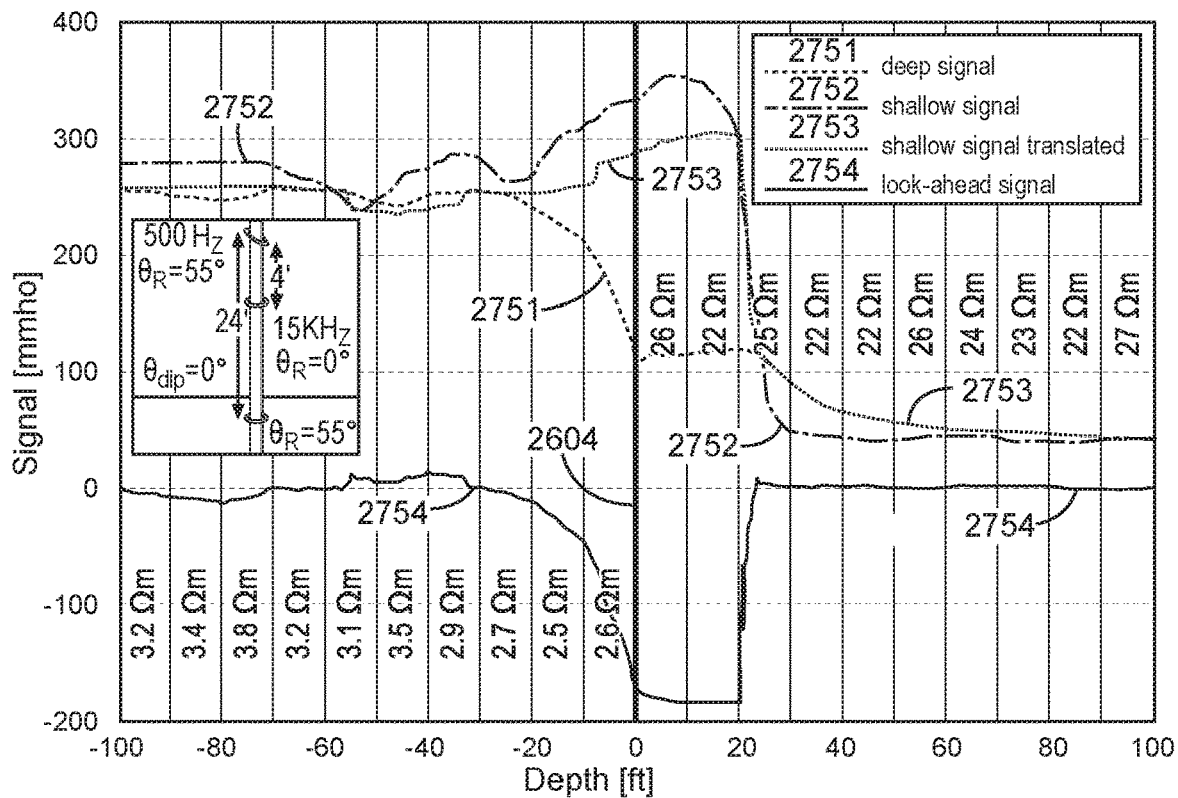

FIGS. 26 and 27 compare standard and layer signal cancelling configurations for a practical case with a large number of layers with some resistivity variation. FIG. 26 shows a synthetic log with 2 zones (separated by interface 2604) and 20 layers with respect to a standard measurement configuration. FIG. 27 shows a synthetic log with 2 zones (separated by interface 2604) and 20 layers with respect to a layer signal cancelling configuration. In this example, the first zone resistivity ranges between 2.5 and 3.8 Ωm and the second zone resistivity ranges between 22 and 27 Ωm with an interface 2604 between the zones. In both configurations, the same antenna locations are used but with different tilt angles. FIG. 26 shows an antenna having tilt angle of 45° with a spacing of 24 ft. to an antenna having a tilt angle of 0° operating at 500 Hz and the antenna having tilt angle of 45° with a spacing of 4 ft. to another antenna having a tilt angle of 0° operating at 15 KHz. FIG. 27 shows an antenna having tilt angle of 55° with a spacing of 24 ft. to an antenna having a tilt angle of 55° operating at 500 Hz and the antenna having tilt angle of 55° with a spacing of 4 ft. to &nil another antenna having a tilt angle of 0° operating at 15 KHz. Curve 2651 shows a deep signal. Curve 2652 shows a shallow signal. Curve 2653 shows a shallow signal translated. Curve 2654 shows a look-head signal. Curve 2751 shows a deep signal. Curve 2752 shows a shallow signal. Curve 2753 shows a shallow signal translated. Curve 2754 shows a look-head signal.

In the layer signal cancelling configuration, tilt angles for the deep reading with an example 24 ft spacing between antennas are set such that the effect illustrated in FIG. 3 is achieved. In the standard configuration, the boundary effect becomes significant around at 5 ft distance from the boundary due to large sensitivity to layers between the bottom and the middle antenna. For the layer signal cancelling configuration, the depth of detection is increased to 15 ft. Another important feature of layer signal cancellation is that the shape of the deep signal itself also becomes directly indicative of the layers ahead of and behind the tool as shown, for example, in FIG. 9. The effect of the layers behind the tool is removed in the process illustrated in FIG. 14 and cannot be seen in the look-ahead signal. The plateau observed between depths 0 and 20 ft is due to insensitivity of the tool to the formations between the middle antenna and bottom antenna. This effect can be removed by using a configuration such as that in FIG. 23.

Figure 28A:
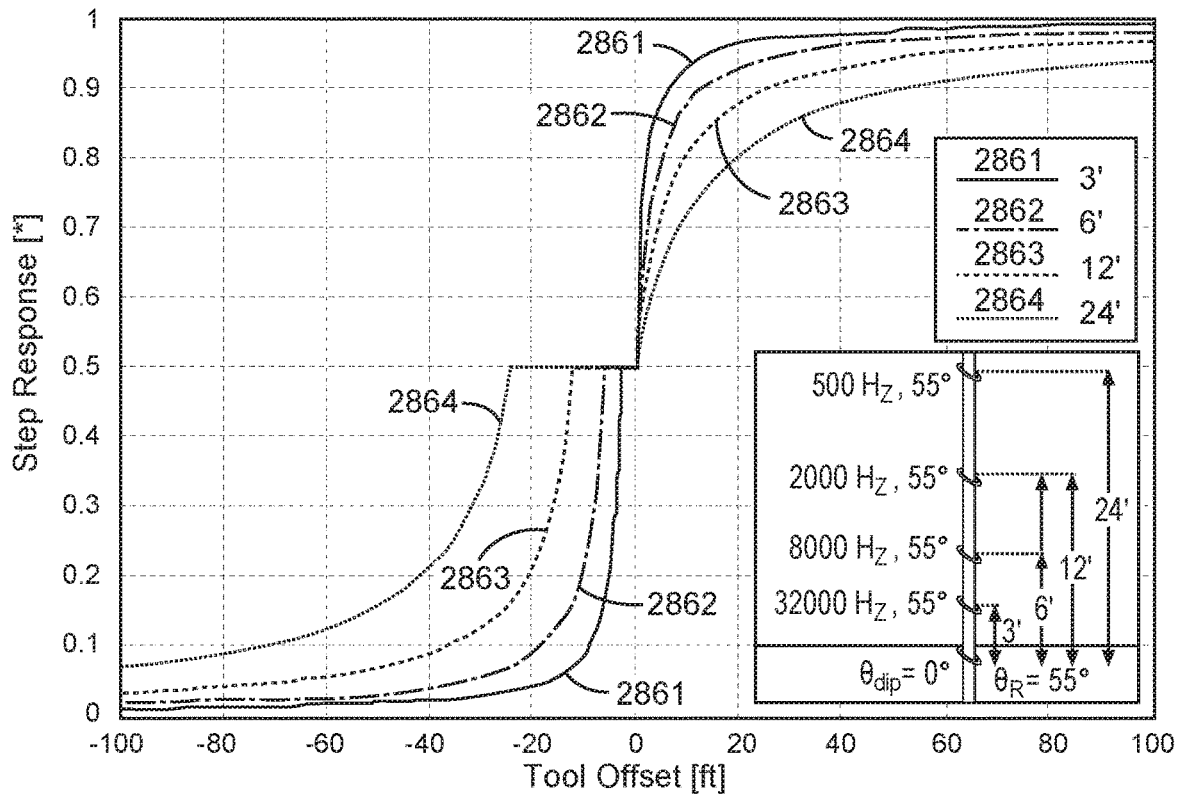
FIG. 28A-C shows an example step response model and example differential signal models, in accordance with various embodiments.
Figure 28B:
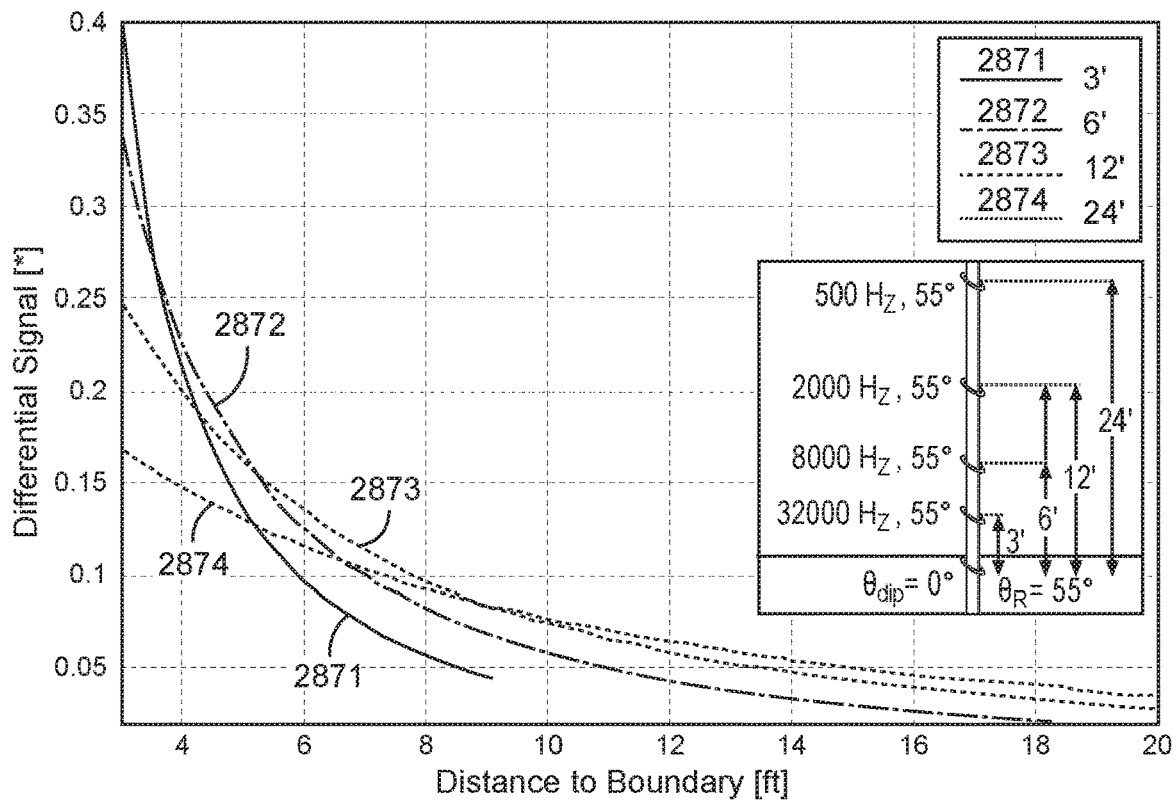
Figure 28C:
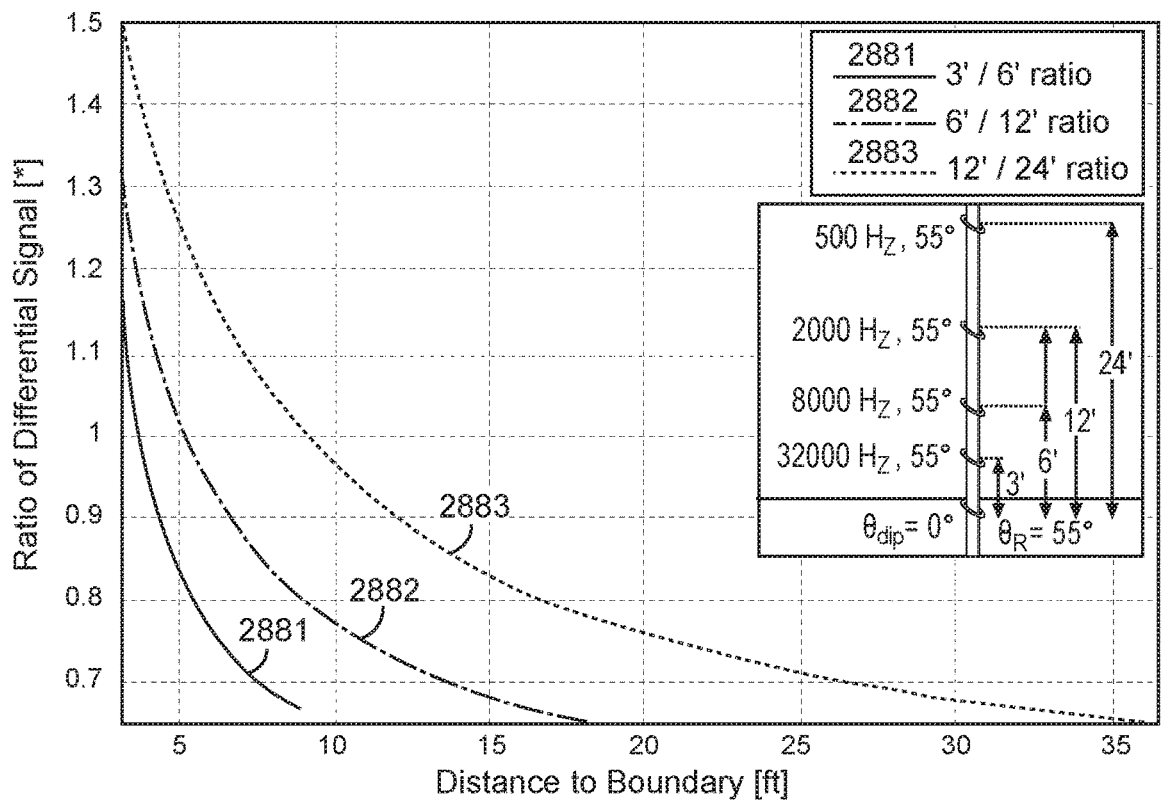

FIGS. 28A-C shows an example step response model and example differential signal models. FIG. 28A shows the step response model, FIG. 28B shows a differential signal model, and FIG. 28C shows a differential signal ratio model. These models can be obtained via the equations associated with FIG. 16. A tool with multiple spacings can be used. The multiple spacings in FIGS. 28A-C from four antennas each at tilt angle of 55° include spacings of 3 ft. operating at 32000 Hz, 6 ft. operating at 8000 Hz, 12 ft. operating at 2000 Hz, and 24 ft operating at 500 Hz each from a common antenna with tilt angle of 55°. Since profile step transition is assumed to be at z=0, the tool offset is equal to distance to boundary for positive values. Curve 2861 shows a step response for the 3 ft spacing. Curve 2862 shows a step response for the 6 ft spacing. Curve 2863 shows a step response for the 12 ft spacing. Curve 2864 shows a step response for the 24 ft spacing. Curve 2871 shows a differential signal for the 3 ft spacing. Curve 2872 shows a differential signal for the 6 ft spacing. Curve 2873 shows a differential signal for the 12 ft spacing. Curve 2874 shows a differential signal for the 24 ft spacing. Curve 2881 shows a ratio of a differential signal for a ratio of the 3 ft spacing to the 6 ft spacing. Curve 2882 shows a ratio of a differential signal for a ratio of the 6 ft spacing to the 12 ft spacing. Curve 2883 a ratio of a differential signal for a ratio of the 12 ft spacing to the 24 ft spacing. It can be seen from the differential signal plot that, for each differential signal value in the considered range, a unique distance to boundary can be found. The sensitivity of differential signal with distance to boundary decreases as the latter increases. Similar observations can be made for the differential signal ratio.

Figure 29:
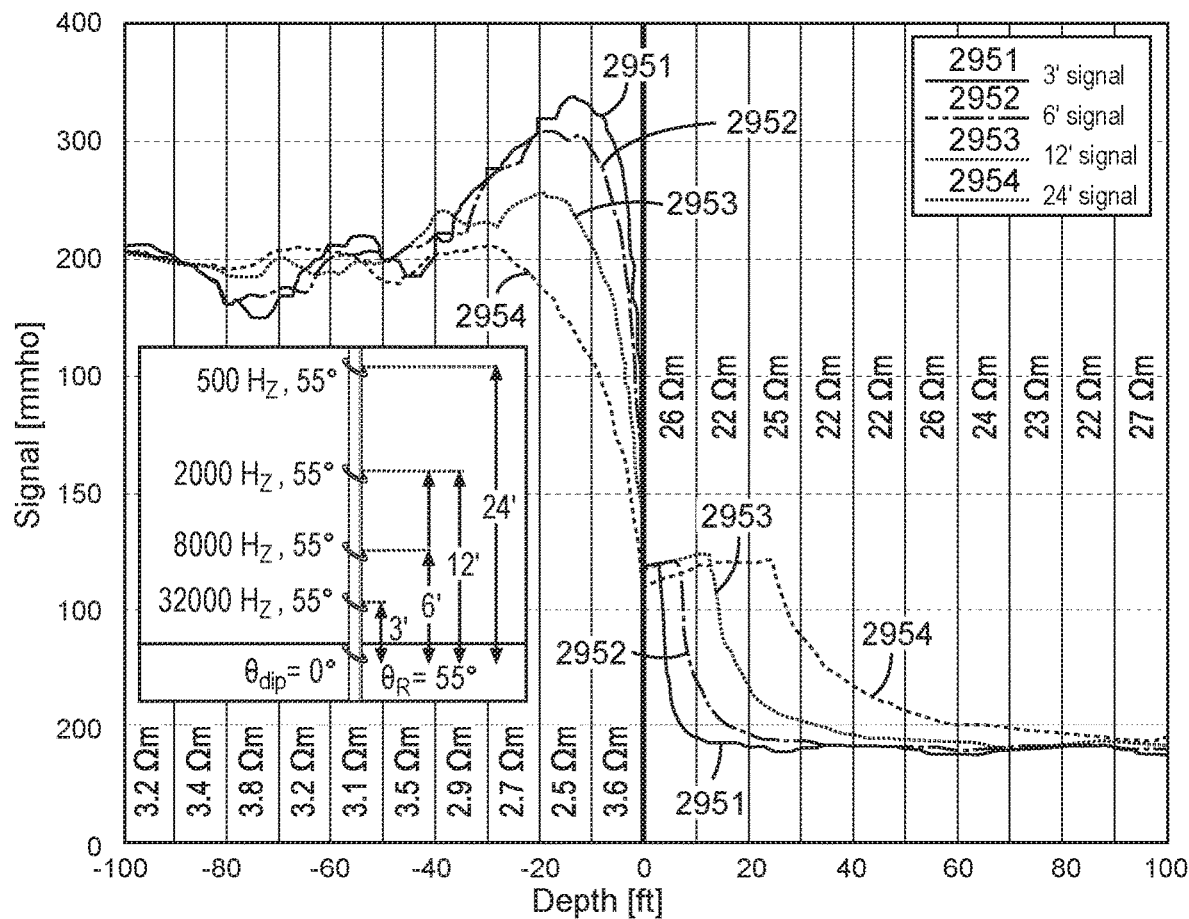
FIG. 29 shows skin effect corrected signals for an example case, in accordance with various embodiments.

FIG. 29 shows skin effect corrected signals for an example case having multiple boundaries and two zones. In this example, multiple spacings are shown from four antennas each at tilt angle of 55° with respective spacings of 3 ft. operating at 32000 Hz, 6 ft. operating at 8000 Hz, 12 ft. operating at 2000 Hz, and 24 ft operating at 500 Hz each from a common antenna with tilt angle of 55°. Example conductivity values are shown in FIG. 29. Curve 2951 shows a signal for the 3 ft spacing. Curve 2952 shows a signal for the 6 ft spacing. Curve 2953 shows a signal for the 12 ft spacing. Curve 2954 shows a signal for the 24 ft spacing.

Figure 30A:
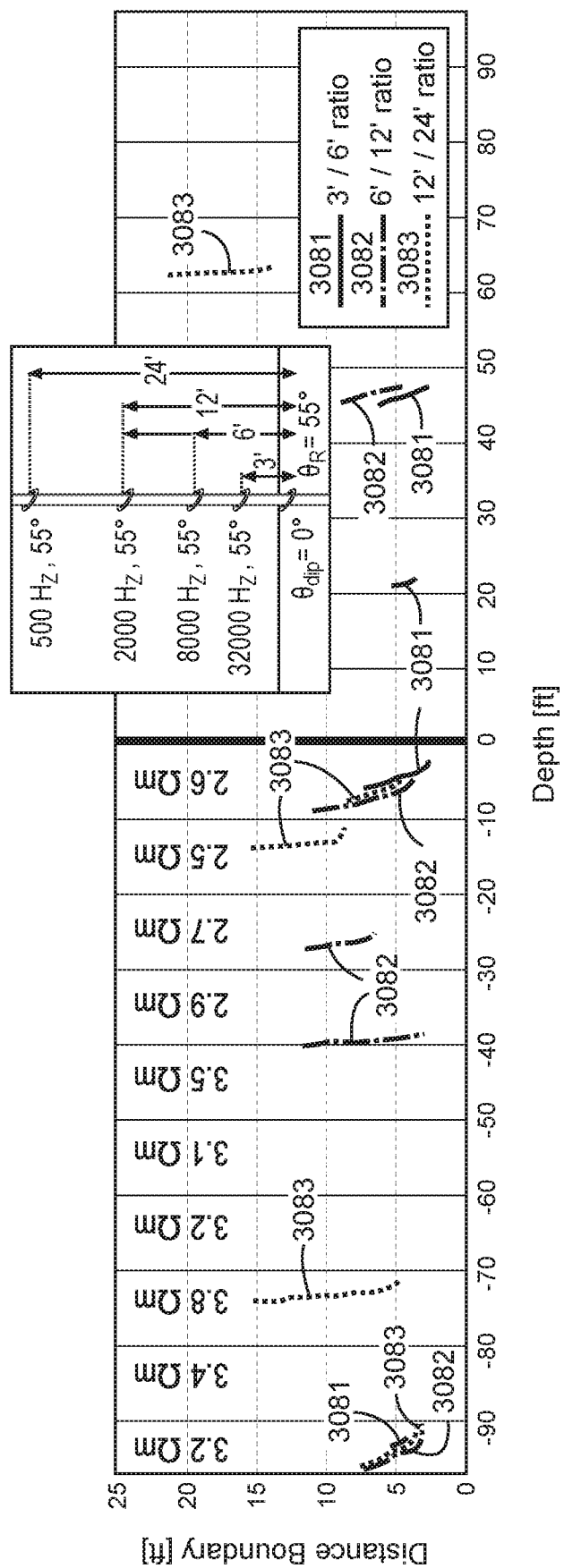
FIG. 30A-B shows inverted distance to boundary and conductivity contrast for an example case, in accordance with various embodiments.
Figure 30B:
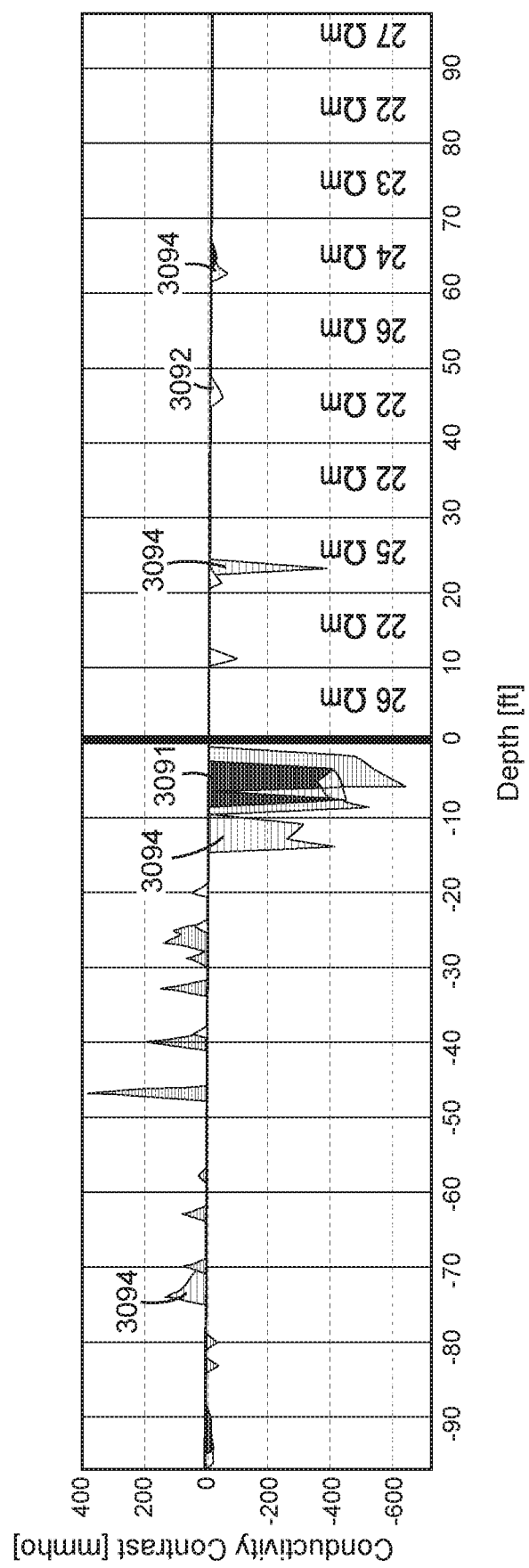

FIGS. 30A-B show inverted distance to boundary and conductivity contrast for the example case of FIG. 29. In this example, multiple spacings are shown from four antennas each at tilt angle of 55° with respective spacings of 3 ft. operating at 32000 Hz, 6 ft. operating at 8000 Hz, 12 ft. operating at 2000 Hz, and 24 ft operating at 500 Hz each from a common antenna with tilt angle of 55°. The inverted distance to boundary and conductivity contrast values can be obtained using the algorithm associated with FIG. 18. In FIG. 30A, curve 3081 shows distance for a ratio of the 3 ft spacing to the 6 ft spacing. Curve 3082 shows distance for a ratio of the 6 ft spacing to the 12 ft spacing. Curve 3083 shows distance for a ratio of the 12 ft spacing to the 24 ft spacing. In FIG. 30B, area 3091 shows conductivity contrast for the 3 ft spacing. Area 3092 shows conductivity contrast for the 6 ft spacing. Area 3094 shows conductivity contrast for the 24 ft spacing. In this case, instead of using the look-ahead signal, the total signals in FIG. 29 are used directly. This can produce good results due to layer signal cancelling property of the measurement which focuses the signal ahead of the tool. Even though this also produces some focusing towards the back of the tool, back sensitivity does not produce artifacts if no large conductivity variations exist at the back of the tool as it approaches the zone boundary. The differential measurement spacing is chosen with $\Delta z = 2$ ft. in this example, large enough to eliminate effect of measurement noise and small enough to allow small depth of detection measurement. It can be seen from the figure that the two deepest measurements in this example at 24 ft spacing and 12 ft spacing can read distance and resistivity at around 15 feet away from the boundary. Resistivity values obtained from the algorithm are close to the actual contrast of about 300-400 mmho. Distance measurement is also close to the actual values. Using an embodiment of an inversion method as taught herein, determination of the desired parameters can be successful attained, even without fully separating the look-ahead signal and with multiple layers. In additional tests, it has been determined that if no layer signal cancellation is used, signal from multiple layers overwhelm the results and inversion is unsuccessful.

Look-ahead of the bit resistivity tools can make measurements of formations that are not yet drilled, and allow better geosteering decisions to maximize production and reduce dangerous situations such as drilling into pressure abnormalities. Existing efforts have been focused to increasing the sensitivity ahead of the tool, but have not completely addressed the sensitivity around the tool. A tool with large sensitivity around the tool is expected to have much greater difficulties in sensing the signal ahead of the tool. In various embodiments, apparatuses are configured to essentially completely eliminate electromagnetic deep reading sensitivity to regions located sideways to the measurement tool and focus ahead of the tool. This arrangement can provide enhanced measurement sensitivity as compared to tools and methods that eliminate the direct signal between a transmitter and its associated receiver on a tool by utilizing special tilt angles. This arrangement may significantly increase the success of the deep reading tool, since one of the biggest sensor physics-related risks is considered to be complications due to layers that are around the tool. Tools arranged and structured to operate according to embodiments similar to or identical to the embodiments taught herein can be used in geosteering and pore pressure measurement applications.

Various components of a measurement tool and a processing unit that generates a look-ahead signal and formation properties ahead of a drill bit using shallow measurements and deep measurements with and without a transmitter-receiver antenna pair oriented to cancel or substantially cancel out signals from layers between the transmitter antenna and the receiver antenna in response to the transmitter being operated downhole in a well, as described herein or in a similar manner, can be realized in combinations of hardware and software implementations. These implementations may include a machine-readable medium having machine-executable instructions, such as a computer-readable medium having computer-executable instructions, for operating a system to control activation of a tool disposed downhole, the tool having an arrangement of transmitter antennas and receiver antennas spaced apart operable in selected transmitter-receiver pairs; to acquire a deep signal from a deep measurement using a transmitter-receiver pair and one or more shallow signals from one or more shallow measurements using one or more other transmitter-receiver pairs; to process the one or more shallow signals, generating a modeled signal relative to regions adjacent sides and back of the tool; and to form a look-ahead signal substantially without contributions from the regions adjacent the tool by processing the deep signal with respect to the modeled signal. The instructions can include instructions to operate a tool having a plurality of transmitter-receiver pairs and process signals from deep measurements and shallow measurements similar to or identical to processes discussed with respect to FIGS. 1-30A-B. The instructions can include instructions to operate a tool and a geosteering operation in accordance with the teachings herein. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

Figure 31:
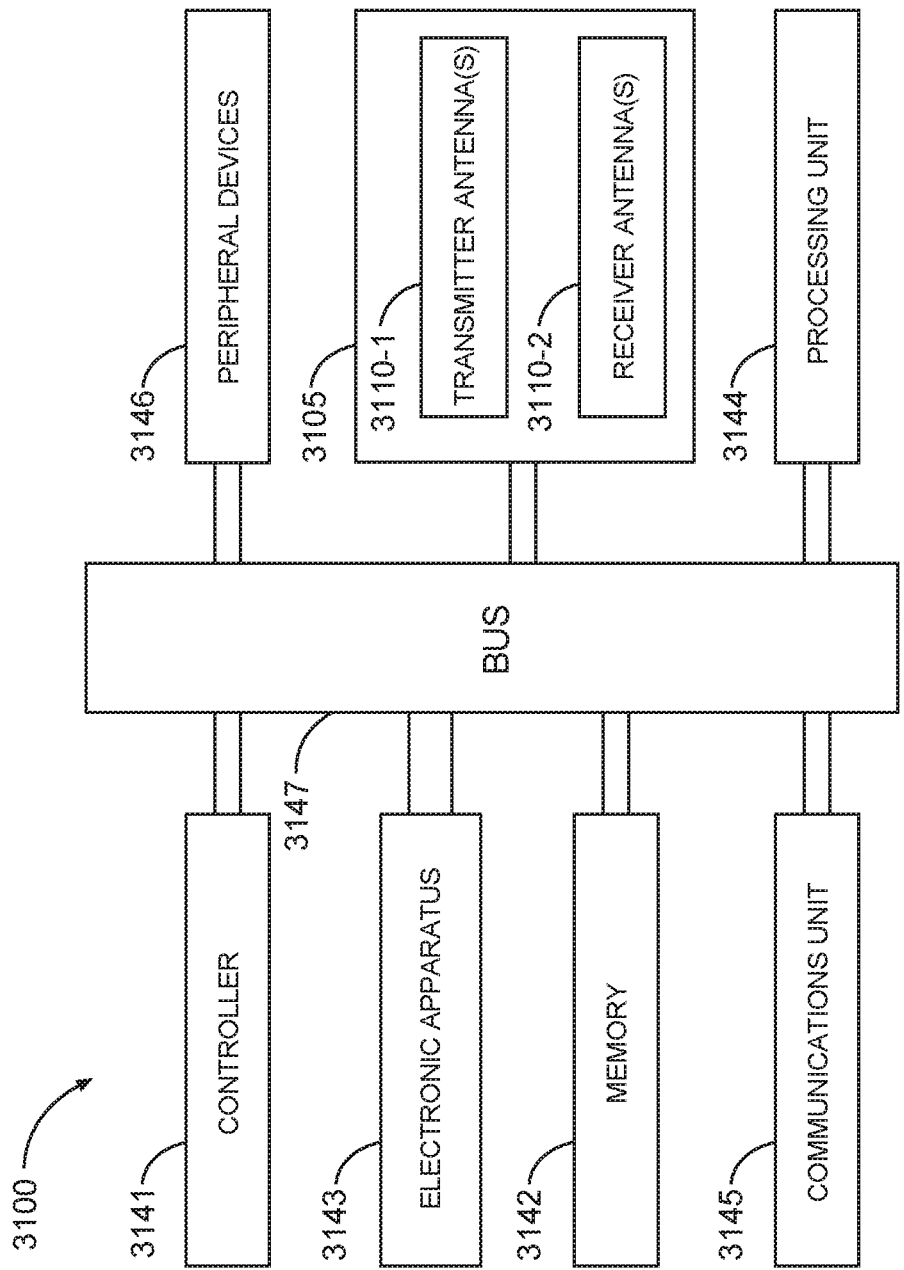
FIG. 31 depicts a block diagram of features of an example system to control activation of arrangements of antennas and process received signals for look-ahead of the bit applications, according to various embodiments.

FIG. 31 depicts a block diagram of features of an embodiment of a system 3100 including a sensor tool 3105 having an arrangement of transmitters and receivers in which measurement signals can be acquired for deep measurements and shallow measurements to generate a look-ahead signal and determine formation properties ahead of a drill bit. The arrangements of transmitters 3110-1 and receivers 3110-2 of sensor tool 3105 can be realized similar to or identical to arrangements discussed herein. The arrangements can include one or more transmitter-receiver antenna pairs arranged to cancel or substantially cancel out signals from layers between the transmitter antenna and the receiver antenna in response to the transmitter being operated downhole in a well.

System 3100 can also include a controller 3141, a memory 3142, an electronic apparatus 3143, and a communications unit 3145. Controller 3141, memory 3142, and communications unit 3145 can be arranged to operate sensor tool 3105 to determine a look-ahead signal and to determine properties of the region ahead of sensor tool 3105. With sensor tool 3105 affixed to a drill string close to or at the drill bit, the region ahead of sensor tool 3105 is the region ahead of the drill bit. Controller 3141, memory 3142, and electronic apparatus 3143 can be realized to include control activation of transmitter antennas and selection of receiver antennas in sensor tool 3105 and to manage processing schemes in accordance with measurement procedures and signal processing as described herein. Communications unit 3145 can include downhole communications in a drilling operation. Such downhole communications can include a telemetry system.

System 3100 can also include a bus 3147, where bus 3147 provides electrical conductivity among the components of system 3100. Bus 3147 can include an address bus, a data bus, and a control bus, each independently configured. Bus 3147 can also use common conductive lines for providing one or more of address, data, or control, the use of which can be regulated by controller 3141. Bus 3147 can be configured such that the components of system 3100 are distributed. Such distribution can be arranged between downhole components such as transmitters and receivers of sensor tool 3105 and components that can be disposed on the surface of a well. Alternatively, the components can be co-located such as on one or more collars of a drill string or on a wireline structure.

In various embodiments, peripheral devices 3146 can include displays, additional storage memory, and/or other control devices that may operate in conjunction with controller 3141 and/or memory 3142. In an embodiment, controller 3141 can be realized as one or more processors. Peripheral devices 3146 can be arranged with a display with instructions stored in memory 3142 to implement a user interface to manage the operation of sensor tool 3105 and/or components distributed within system 3100. Such a user interface can be operated in conjunction with communications unit 3145 and bus 3147. Various components of system 3100 can be integrated with sensor tool 3105 such that processing identical to or similar to the processing schemes discussed with respect to various embodiments herein can be performed downhole in the vicinity of the measurement or at the surface.

Figure 32:
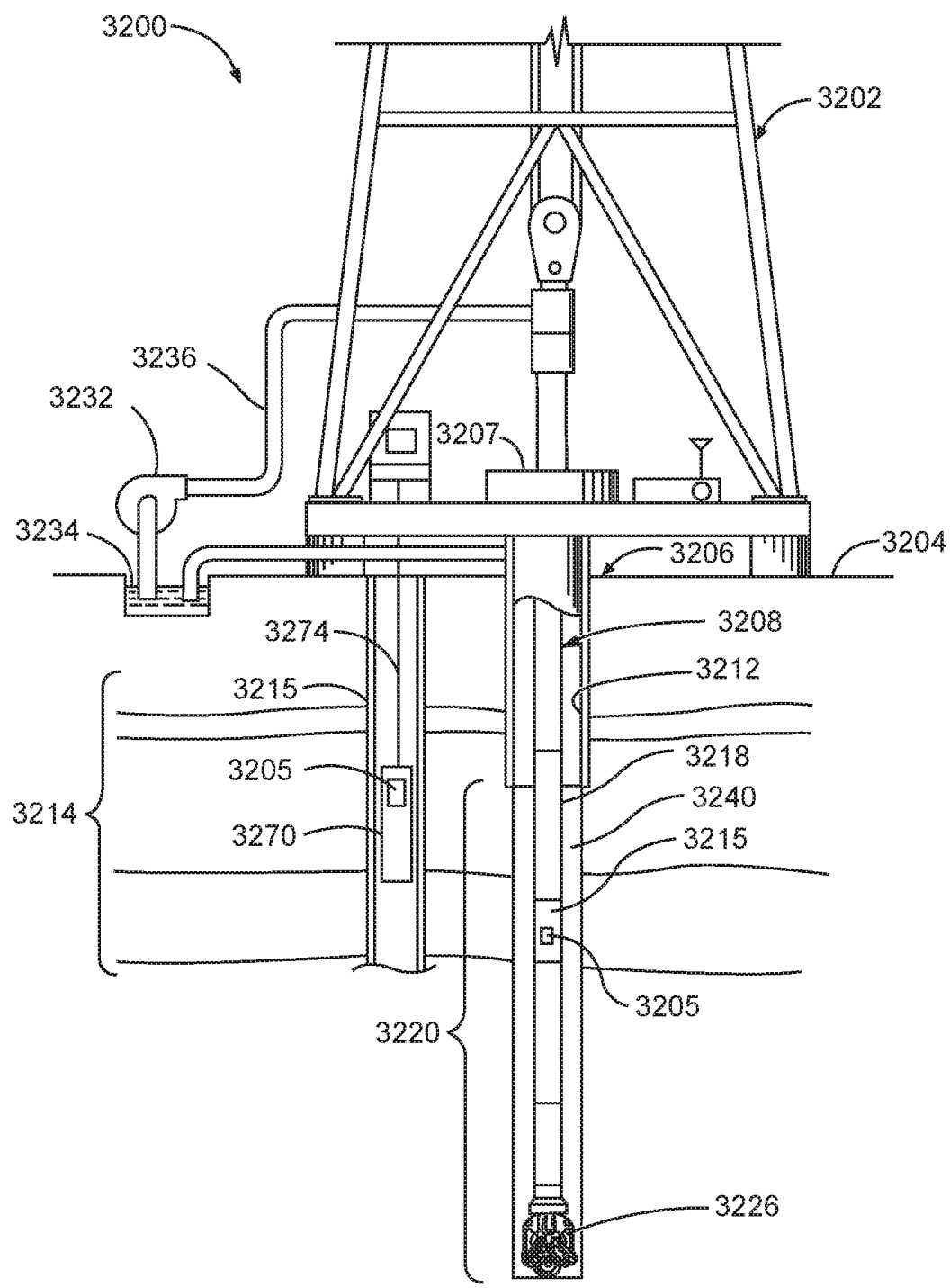
FIG. 32 depicts an embodiment of a system at a drilling site, according to various embodiments.

FIG. 32 depicts an embodiment of a system 3200 at a drilling site, where system 3200 includes a sensor tool 3105 having an arrangement of transmitters and receivers in which measurement signals can be acquired for deep measurements and shallow measurements to generate a look-ahead signal and determine formation properties ahead of a drill bit. The arrangements of transmitters and receivers of sensor tool 3105 can be realized in similar to or identical to arrangements discussed herein. The arrangements can include one or more transmitter-receiver antenna pairs arranged to cancel or substantially cancel out signals from layers between the transmitter antenna and the receiver antenna in response to the transmitter being operated downhole in a well.

System 3200 can include a drilling rig 3202 located at a surface 3204 of a well 3206 and a string of drill pipes, that is, drill string 3208, connected together so as to form a drilling string that is lowered through a rotary table 3207 into a wellbore or borehole 3212. The drilling rig 3202 can provide support for drill string 3208. The drill string 3208 can operate to penetrate rotary table 3207 for drilling a borehole 3212 through subsurface formations 3214. The drill string 3208 can include drill pipe 3218 and a bottom hole assembly 3220 located at the lower portion of the drill pipe 3218.

The bottom hole assembly 3220 can include drill collar 3215, sensor tool 3205, and a drill bit 3226. In various embodiments, sensor tool 3205 can include a sensor located as close as possible to drill bit 3226. The drill bit 3226 can operate to create a borehole 3212 by penetrating the surface 3204 and subsurface formations 3214. Sensor tool 3205 can be structured for an implementation in the borehole of a well as an MWD system such as an LWD system. Sensor tool 3205 can be realized with a housing containing electronics to activate a transmitting source and to collect responses at selected receiving sensors. Such electronics can include a processing unit to analysis signals collected by sensor tool 3205 and provide processed results to the surface over a standard communication mechanism for operating a well. Alternatively, electronics can include a communications interface to provide signals sensed by sensor tool 3205 to the surface over a standard communication mechanism for operating a well, where these sensed signals can be analyzed at a processing unit at the surface.

In various embodiments, sensor tool 3205 may be included in a tool body 3270 coupled to a logging cable 3274 such as, for example, for wireline applications. Tool body 3270 containing sensor tool 3205 can include electronics to activate a transmitting sensor of sensor tool 3205 and collect responses from selected receiving sensors of sensor tool 3205. Such electronics can include a processing unit to analysis signals collected by sensor tool 3205 and provide processed results to the surface over a standard communication mechanism for operating in a well. Alternatively, electronics can include a communications interface to provide signals collected by sensor tool 3205 to the surface over a standard communication mechanism for operating in a well, where these collected signals are analyzed at a processing unit at the surface. Logging cable 3274 may be realized as a wireline (multiple power and communication lines), a mono-cable (a single conductor), and/or a slick-line (no conductors for power or communications), or other appropriate structure for use in bore hole 3212.

During drilling operations, the drill string 3208 can be rotated by the rotary table 3207. In addition to, or alternatively, the bottom hole assembly 3220 can also be rotated by a motor (e.g., a mud motor) that is located downhole. The drill collars 3215 can be used to add weight to the drill bit 3226. The drill collars 3215 also can stiffen the bottom hole assembly 3220 to allow the bottom hole assembly 3220 to transfer the added weight to the drill bit 3226, and in turn, assist the drill bit 3226 in penetrating the surface 3204 and subsurface formations 3214.

During drilling operations, a mud pump 3232 can pump drilling fluid (sometimes known by those of skill in the art as "drilling mud") from a mud pit 3234 through a hose 3236 into the drill pipe 3218 and down to the drill bit 3226. The drilling fluid can flow out from the drill bit 3226 and be returned to the surface 3204 through an annular area 3240 between the drill pipe 3218 and the sides of the borehole 3212. The drilling fluid may then be returned to the mud pit 3234, where such fluid is filtered. In some embodiments, the drilling fluid can be used to cool the drill bit 3226, as well as to provide lubrication for the drill bit 3226 during drilling operations. Additionally, the drilling fluid may be used to remove subsurface formation 3214 cuttings created by operating the drill bit 3226.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. An apparatus comprising:
    a tool having a plurality of antennas with different tilt angles; and
    a control unit and a data processing unit operable to select at least two of the plurality of antennas as a first transmitter antenna and a first receiver antenna of a transmitter and receiver antenna pair, wherein the control unit selects the at least two of the plurality of antennas based on their tilt angles at least reducing signals from layers between the first transmitter antenna and the first receiver antenna or at least reducing signals from layers being outside a region between the first transmitter antenna and the first receiver antenna in response to the transmitter being operated in a formation.

2. The apparatus of claim 1, wherein the control unit and the data processing unit are further operable to create a transmitter or receiver antenna signal corresponding to a synthetic tilt angle by combining signals from at least two collocated antennas of the plurality of antennas.

3. The apparatus of claim 2, wherein the control unit and the data processing unit are further operable to algorithmically choose the synthetic tilt angle based, at least in part, on signal reduction and formation dip angles.

4. The apparatus of claim 2, wherein the control unit and the data processing unit are further operable to create a first transmitter antenna signal corresponding to a transmitter synthetic tilt angle by combining signals from at least two collocated antennas that include the first transmitter antenna and create a first receiver antenna signal corresponding to a receiver synthetic tilt angle by combining signals from at least two collocated antennas that include the first receiver antenna.

5. The apparatus of claim 1, wherein the control unit is further operable to conduct an absolute deep measurement using the transmitter and receiver pair.

6. The apparatus of claim 1, wherein the control unit and data processing unit is further operable to select
    a transmitter and receiver pair as a first transmitter and receiver antenna pair to make shallow measurements, wherein a spacing between the first transmitter antenna and the first receiver antenna of the first transmitter and receiver antenna pair is in a range from two feet to twenty feet; and
    at least two of the plurality of antennas as a second transmitter and receiver antenna pair to make deep measurements, wherein a spacing between a second transmitter antenna and a second receiver antenna of the second transmitter and receiver antenna pair is in a range from twenty feet to a hundred feet.

7. The apparatus of claim 6 wherein the first transmitter antenna of the first transmitter and receiver antenna pair is also the second transmitter antenna of the second transmitter and receiver antenna pair or wherein the first receiver antenna of the first transmitter and receiver antenna pair is also the second receiver antenna of the second transmitter and receiver antenna pair.

8. The apparatus of claim 1,
    wherein the data processing unit is further operable to process signals from the transmitter and receiver antenna pair to generate a look-ahead signal with reduced contributions from regions adjacent to sides of the tool.

9. The apparatus of claim 1, wherein to at least reducing signals from layers between the first transmitter antenna and the first receiver antenna includes canceling signals from layers between the first transmitter antenna and the first receiver antenna.

10. The apparatus of claim 1 wherein the control unit and the data processing unit are further operable to select at least one of the plurality of antennas as a second receiver antenna,
    wherein the control unit selects the second receiver antenna based on its tilt angle at least reducing signals from layers between the first transmitter antenna and the second receiver antenna, and
    wherein the control unit is further operable to conduct a ratio deep measurement with at least the first transmitter antenna, first receiver antenna and the second receiver antenna.

11. The apparatus of claim 1, wherein the control unit and the data processing unit are further operable to select at least one of the plurality of antennas as a second transmitter antenna and to select at least one of the plurality of antennas as a second receiver antenna, wherein the control unit selects the second transmitter antenna and the second receiver antenna based on their tilt angles at least reducing signals from layers between the second transmitter antenna and the second receiver antenna, and wherein the control unit is further operable to conduct a compensated deep measurement with at least the first transmitter antenna, the second transmitter antenna, the first receiver antenna and the second receiver antenna.

12. An apparatus comprising:

a plurality of antennas of a wellbore tool, each antenna of the plurality of antennas having a tilt angle with respect to a longitudinal axis of the wellbore tool;

a control unit operable to, select two antennas of the plurality of antennas based on their tilt angles as a deep measurement transmitter and receiver pair to perform one or more deep measurements;

select two antennas of the plurality of antennas based on their tilt angles as a shallow measurement transmitter and receiver pair to perform one or more shallow measurements; and a data processing unit to process data from the one or more deep measurements and the one or more shallow measurements to generate a look-ahead signal with at least reduced contributions from regions adjacent to sides of the wellbore tool.

13. The apparatus of claim 12, wherein the data processing unit is further operable to, equalize the data from the one or more shallow measurements to the data from the one or more deep measurements based, at least in part, on geometrical factors; and generate the look-ahead signal based, at least in part, on a difference between the data from the one or more deep measurements and equalized data from the one or more shallow measurements.

14. The apparatus of claim 13, wherein the data processing unit is further operable to, equalize the data from the one or more shallow measurements via a deconvolution filter.

15. The apparatus of claim 12, wherein the data processing unit is operable to, perform an inversion based on the data from the one or more shallow measurements and the data from the one or more deep measurements;

derive data for one or more anticipated deep measurements based, at least in part, on the inversion;

subtract the data for the one or more anticipated deep measurements from one or more corresponding deep measurements; and generate a look-ahead signal based, at least in part, on the subtraction.

16. The apparatus of claim 12, wherein the data processing unit is operable to, perform an inversion based on the data from the one or more shallow measurements;

apply data from the inversion and the data from the one or more deep measurements to a forward model;

subtract the data from the forward model from the one or more deep measurements; and generate the look-ahead signal based, at least in part, on the subtraction.

17. The apparatus of claim 12, wherein the control unit is operable to, at least one of select the two antennas as a deep measurement transmitter and receiver pair to at least reduce signals from layers between the two antennas of the deep measurement transmitter and receiver pair; and select the two antennas as a shallow measurement transmitter and receiver pair to at least reduce signals from layers between the two antennas of the shallow measurement transmitter and receiver pair.

18. The apparatus of claim 12, wherein each of the plurality of antennas has a tilt angle relative to a longitudinal axis of the wellbore tool and wherein the control unit is further operable to select antennas of the plurality of antennas based, at least in part, on the tilt angle such that contributions from regions adjacent to the sides of the wellbore tool are reduced.

19. A method for measuring look ahead resistivity comprising:

selecting a first transmitter antenna with a first tilt angle and a first receiver antenna with a second tilt angle as a first transmitter and receiver antenna pair, wherein selecting the first transmitter antenna and the first receiver antenna is based on the first tilt angle and the second tilt angle reducing contributions to a shallow measurement signal from regions between the first transmitter antenna and the first receiver antenna;

selecting a second transmitter antenna with a third tilt angle and a second receiver antenna with a fourth tilt angle as a second transmitter and receiver antenna pair, wherein selecting the second transmitter antenna and the second receiver antenna is based on the third tilt angle and the fourth tilt angle reducing contributions to a deep measurement signal from regions between the second transmitter antenna and the second receiver antenna;

acquiring the shallow measurement signal from the first transmitter and receiver antenna pair;

acquiring the deep measurement signal from the second transmitter and receiver antenna pair; and generating a look ahead resistivity measurement based, at least in part, on a difference between the shallow measurement signal and the deep measurement signal.

20. The method of claim 19, wherein at least one of the first transmitter antenna, the first receiver antenna, the second transmitter antenna, and the second receiver antenna comprises a combination of signals from two or more collocated antennas with a corresponding synthetically generated tilt angle.

* * * * *

UNITED STATES PATENT AND TRADEMARK OFFICE
CERTIFICATE OF CORRECTION

PATENT NO. : 11,054,541 B2
APPLICATION NO. : 15/953617
DATED : July 6, 2021
INVENTOR(S) : Donderici et al.

Page 1 of 1

It is certified that error appears in the above-identified patent and that said Letters Patent is hereby corrected as shown below:

On the Title Page

Item [54], and in the Specification, Column 1 Line 1 -Resitivity- should read --Resistivity--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*